US008469790B1

(12) United States Patent
Itkis et al.

(10) Patent No.: US 8,469,790 B1
(45) Date of Patent: Jun. 25, 2013

(54) WIRELESS WAGERING SYSTEM

(75) Inventors: Yuri Itkis, Las Vegas, NV (US); Boris Itkis, Las Vegas, NV (US)

(73) Assignee: FortuNet, Inc., Las Vegas, NV (US)

( * ) Notice: Subject to any disclaimer, the term of this patent is extended or adjusted under 35 U.S.C. 154(b) by 0 days.

(21) Appl. No.: 12/905,448

(22) Filed: Oct. 15, 2010

Related U.S. Application Data

(63) Continuation-in-part of application No. 10/011,648, filed on Dec. 4, 2001, now abandoned.

(51) Int. Cl.
*A63F 13/00* (2006.01)

(52) U.S. Cl.
USPC .............................................. 463/19; 463/42

(58) Field of Classification Search
USPC ......................................... 463/19, 40, 42, 43
See application file for complete search history.

(56) References Cited

U.S. PATENT DOCUMENTS

| | | | | |
|---|---|---|---|---|
| 1,310,719 | A | | 7/1919 | Vernam |
| 3,868,018 | A | | 2/1975 | Thies |
| 4,254,404 | A | | 3/1981 | White |
| 4,270,370 | A | | 6/1981 | Oftelie |
| 4,339,798 | A | | 7/1982 | Hedges et al. |
| 4,378,940 | A | | 4/1983 | Gluz et al. |
| 4,455,025 | A | | 6/1984 | Itkis |
| 4,534,012 | A | | 8/1985 | Yokozawa |
| 4,534,373 | A | | 8/1985 | Glinka et al. |
| 4,624,462 | A | | 11/1986 | Itkis |
| 4,670,857 | A | | 6/1987 | Rackman |
| RE32,480 | E | | 8/1987 | Bolan |
| 4,760,527 | A | | 7/1988 | Sidley |
| 4,768,151 | A | | 8/1988 | Birenbaum et al. |
| 4,856,787 | A | | 8/1989 | Itkis |
| 4,871,054 | A | | 10/1989 | Murray |
| 4,909,516 | A | | 3/1990 | Kolinsky |
| 5,007,649 | A | | 4/1991 | Richardson |
| 5,043,887 | A | | 8/1991 | Richardson |
| 5,054,787 | A | * | 10/1991 | Richardson ..................... 463/19 |
| 5,072,381 | A | | 12/1991 | Richardson et al. |
| 5,096,195 | A | | 3/1992 | Gimmon |
| 5,119,295 | A | | 6/1992 | Kapur |
| 5,179,517 | A | | 1/1993 | Sarbin et al. |
| 5,212,636 | A | | 5/1993 | Nakazawa |
| 5,230,514 | A | | 7/1993 | Frain |
| 5,276,312 | A | | 1/1994 | McCarthy |

(Continued)

FOREIGN PATENT DOCUMENTS

EP 1112765 A1 7/2001

OTHER PUBLICATIONS

Green, Marian, "Expanding Casino Borders", International Gaming and Wagering Business, Sep. 2001, p. 50.

(Continued)

*Primary Examiner* — James S McClellan
(74) *Attorney, Agent, or Firm* — Greenberg Traurig

(57) ABSTRACT

Floor-agent-operated wireless barcode reader for reading the barcodes imprinted on bingo packs along with barcode labels affixed to player loyalty cards and portable and/or stationary bingo player units. The two or three barcodes read by the barcode reader are transmitted over a WiFi channel to a central file server that downloads bingo player units identified by the barcodes with the bingo packs bar-coded identification and/or contents over a local area network. In addition, the central file server tracks player spend utilizing the bar-coded player identification.

13 Claims, 20 Drawing Sheets

U.S. PATENT DOCUMENTS

| | | | |
|---|---|---|---|
| 5,326,104 A | 7/1994 | Pease et al. | |
| 5,417,424 A | 5/1995 | Snowden et al. | |
| 5,478,084 A | 12/1995 | Itkis | |
| 5,507,489 A | 4/1996 | Reibel et al. | |
| 5,569,082 A | 10/1996 | Kaye | |
| 5,609,337 A | 3/1997 | Clapper | |
| 5,621,890 A | 4/1997 | Notarianni et al. | |
| 5,643,086 A | 7/1997 | Alcorn et al. | |
| 5,655,966 A | 8/1997 | Werdin et al. | |
| 5,709,603 A | 1/1998 | Kaye | |
| 5,718,631 A | 2/1998 | Invencion | |
| 5,738,583 A | 4/1998 | Comas et al. | |
| 5,770,533 A | 6/1998 | Franchi | |
| 5,779,545 A | 7/1998 | Berg et al. | |
| 5,791,990 A | 8/1998 | Schroeder et al. | |
| 5,800,268 A | 9/1998 | Molnick | |
| 5,810,664 A | 9/1998 | Clapper | |
| 5,812,641 A | 9/1998 | Kanoh et al. | |
| 5,871,398 A | 2/1999 | Schneier et al. | |
| 5,915,588 A | 6/1999 | Stoken et al. | |
| 5,928,082 A | 7/1999 | Clapper | |
| 5,934,439 A | 8/1999 | Kanoh et al. | |
| 5,949,042 A | 9/1999 | Dietz et al. | |
| 5,951,396 A | 9/1999 | Tawil | |
| 5,954,582 A | 9/1999 | Zach | |
| 5,967,895 A | 10/1999 | Kellen | |
| 5,978,569 A | 11/1999 | Traeger | |
| 5,980,385 A | 11/1999 | Clapper | |
| 5,999,808 A | 12/1999 | LaDue | |
| 6,001,016 A | 12/1999 | Walker et al. | |
| 6,012,983 A | 1/2000 | Walker et al. | |
| 6,015,346 A | 1/2000 | Bennett | |
| 6,024,640 A | 2/2000 | Walker et al. | |
| 6,048,269 A * | 4/2000 | Burns et al. | 463/25 |
| 6,056,289 A | 5/2000 | Clapper | |
| 6,071,190 A | 6/2000 | Weiss et al. | |
| 6,086,471 A | 7/2000 | Zimmermann | |
| 6,089,979 A | 7/2000 | Klein | |
| 6,102,798 A | 8/2000 | Bennett | |
| 6,106,396 A | 8/2000 | Alcorn et al. | |
| 6,110,044 A | 8/2000 | Stern | |
| RE36,946 E | 11/2000 | Diffie et al. | |
| 6,149,522 A | 11/2000 | Alcorn et al. | |
| 6,176,781 B1 | 1/2001 | Walker et al. | |
| 6,199,161 B1 | 3/2001 | Ahvenaheim | |
| 6,210,279 B1 | 4/2001 | Dickinson | |
| 6,218,796 B1 | 4/2001 | Kozlowski | |
| 6,261,177 B1 | 7/2001 | Bennett | |
| 6,266,413 B1 | 7/2001 | Shefi | |
| 6,270,410 B1 | 8/2001 | DeMar et al. | |
| 6,311,976 B1 | 11/2001 | Yoseloff et al. | |
| 6,354,941 B2 | 3/2002 | Miller et al. | |
| 6,394,907 B1 | 5/2002 | Rowe | |
| 6,416,414 B1 | 7/2002 | Stadelmann | |
| 6,424,260 B2 | 7/2002 | Maloney | |
| 6,443,843 B1 | 9/2002 | Walker et al. | |
| 6,445,794 B1 | 9/2002 | Shefi | |
| 6,471,591 B1 | 10/2002 | Crumby | |
| 6,500,067 B1 | 12/2002 | Luciano et al. | |
| 6,527,638 B1 | 3/2003 | Walker et al. | |
| 6,572,471 B1 | 6/2003 | Bennett | |
| 6,607,439 B2 | 8/2003 | Schneier et al. | |
| 6,616,531 B1 | 9/2003 | Mullins | |
| 6,628,939 B2 | 9/2003 | Paulsen | |
| 6,634,942 B2 | 10/2003 | Walker et al. | |
| 6,644,455 B2 | 11/2003 | Ichikawa | |
| 6,645,072 B1 | 11/2003 | Kellen | |
| 6,666,767 B1 | 12/2003 | Dayan | |
| 6,676,522 B2 | 1/2004 | Rowe et al. | |
| 6,682,421 B1 | 1/2004 | Rowe et al. | |
| 6,684,333 B1 | 1/2004 | Walker et al. | |
| 6,702,672 B1 | 3/2004 | Angell et al. | |
| 6,712,698 B2 | 3/2004 | Paulsen et al. | |
| 6,752,312 B1 | 6/2004 | Chamberlain et al. | |
| 6,769,991 B2 | 8/2004 | Fields | |
| 6,835,135 B1 | 12/2004 | Silverbrook et al. | |
| 6,846,238 B2 | 1/2005 | Wells | |
| 6,866,586 B2 | 3/2005 | Oberberger et al. | |
| 6,884,162 B2 | 4/2005 | Raverdy et al. | |
| 6,971,956 B2 | 12/2005 | Rowe et al. | |
| 7,008,317 B2 | 3/2006 | Cote et al. | |
| 7,153,206 B2 | 12/2006 | Bennett, III | |
| 7,422,213 B2 | 9/2008 | Katz et al. | |
| 7,494,414 B2 | 2/2009 | Hedrick et al. | |
| 7,611,407 B1 | 11/2009 | Itkis et al. | |
| 7,867,075 B2 | 1/2011 | Irwin et al. | |
| 7,909,692 B2 | 3/2011 | Nguyen et al. | |
| 7,979,057 B2 | 7/2011 | Ortiz et al. | |
| 8,070,594 B2 | 12/2011 | Hedrick et al. | |
| 2001/0003100 A1 | 6/2001 | Yacenda | |
| 2001/0016514 A1 | 8/2001 | Walker et al. | |
| 2001/0019193 A1 | 9/2001 | Gumina | |
| 2001/0035425 A1 | 11/2001 | Rocco et al. | |
| 2002/0008621 A1 * | 1/2002 | Barritz et al. | 340/572.1 |
| 2002/0045477 A1 | 4/2002 | Dabrowski | |
| 2002/0082070 A1 | 6/2002 | Macke et al. | |
| 2002/0090986 A1 | 7/2002 | Cote et al. | |
| 2002/0094860 A1 | 7/2002 | Itkis et al. | |
| 2002/0098888 A1 | 7/2002 | Rowe et al. | |
| 2002/0111210 A1 | 8/2002 | Luciano et al. | |
| 2002/0193099 A1 | 12/2002 | Paulsen | |
| 2003/0017865 A1 | 1/2003 | Beaulieu et al. | |
| 2003/0064805 A1 | 4/2003 | Wells | |
| 2003/0104865 A1 | 6/2003 | Itkis et al. | |
| 2004/0038736 A1 | 2/2004 | Bryant et al. | |
| 2004/0157584 A1 | 8/2004 | Bensimon et al. | |
| 2004/0229677 A1 | 11/2004 | Gray et al. | |
| 2005/0027570 A1 | 2/2005 | Maier et al. | |
| 2005/0178841 A1 | 8/2005 | Jones et al. | |
| 2005/0239538 A1 | 10/2005 | Dixon | |
| 2006/0094492 A1 | 5/2006 | Wolfe | |

OTHER PUBLICATIONS

Trimon Systems, Inc., “Mobile Casino Solution”, Oct. 2001, 3 pgs.
Nuvo Studios, Inc., “Corporate Profile”, Oct. 2001, 7 pgs.
Rown, Josh, “Bingo Playing Enhanced with New Innovations”, Bingo Manager, Jul. 2001, 3 pgs.
Schneier, Bruce, “Applied Cryptography, Second Edition”, book, 1996, p. 1-18 and 47-74, published by John Wiley & Sons, New York, US and Canada.
FortuNet 2000; FortuNet, Inc.; Las Vegas, NV; circa 1994 Handout; 2 Pages.
FortuNet 2000; Fortunet, Inc.; Las Vegas, NV; circa 1995 Handout; 2 Pages.
Bingo Star by FortuNet, Inc.; Las Vegas, NV; Copyright 1996; 2 Pages.
National Bingo Buyer’s Guide; vol. 7, Fall ’95; 4 Pages.
So. King, Kitsap, Lewis, Pierce, Mason & Thurston; South Sound Edition “Bingo Bugle”, vol. 16, No. 1, Jan. 1995; 4 Pages.
“Scarne’s Encyclopedia of Card Games,” by John Scarne, 1973 HarperCollins, chapters on poker and blackjack.

* cited by examiner

| cell | unit | ready | player | balance | pack | key | points | . . . |
|---|---|---|---|---|---|---|---|---|
| 1<br>2<br>.<br>.<br>.<br>30 | 1 2 3<br>7 5 3<br><br><br><br>0 | 1<br>0<br><br><br><br>0 | 0<br>0<br><br><br><br>0 | | | | | |
| 0<br>0<br>.<br>.<br>. | 1 2 4<br>1 3 0 | 0<br>0 | 123456789<br>37894567 | 10.00<br>5.00 | 12354<br>0 | 7FD3221AB<br>AF354221F | 5<br>10 | |
| 0<br>0<br>.<br>.<br>. | 0<br>0 | 0<br>0 | 72434512<br>32145901 | 0<br>20.00 | 0<br>0 | 0<br>0 | 7<br>0 | |

FIG. 5

WIRELESS WAGERING SYSTEM

CROSS-REFERENCE TO RELATED APPLICATIONS

This application is a continuation-in-part of U.S. patent application Ser. No. 10/011,648; Filed Dec. 4, 2001 now abandoned, which is incorporated herein by reference in its entirety.

BACKGROUND OF THE INVENTION

The present invention relates to gaming devices in general and, more specifically, to portable gaming devices suitable for use in gaming establishments such as casinos and bingo halls.

In recent years, radio-controlled hand-held or portable electronic bingo devices, such as disclosed in U.S. Pat. Nos. 4,455,025 and 4,624,462 both to Itkis and in bingo industry publications, including an article "Bingo Playing Enhanced With New Innovations", Bingo Manager, July, 2001, gained substantial popularity in casinos. However, mobile electronic bingo devices have limited applications in a casino environment and are labor-intensive because of the need to download bingo cards at a point-of-sale terminal operated by a cashier.

Recently, portable remote gaming devices were proposed for playing "classic" casino games such as poker, slots and keno. In particular, U.S. Pat. Nos. 6,012,983 and 6,001,016 both to Walker, et al., propose to utilize pager-like devices for remote monitoring of the progress of a slot game executed automatically on a player's behalf on an actual slot machine available at a "casino warehouse." However, Walker limits play to a rather passive observation of the game and, therefore, diminishes a player's interest in the game. Besides, Walker's approach requires a costly investment in real slot machines located remotely at a "casino warehouse." In addition, Walker does not provide any mechanism for facilitating the labor-intensive process of distributing gaming devices to players and does not assure security of the gaming devices. A commercial implementation of remote playing on a "warehoused" slot machine by GameCast Live as disclosed in "Expanding Casino Borders", International Gaming and Wagering Business, September 2001, suffers from the same deficiencies as Walker's disclosures. Moreover, although GameCast Live offers players convincing video and audio data streams originating at video cameras aimed at actual slot machines, such implementation is labor intensive and requires costly hardware. In addition, such an approach cannot provide a casino with an adequate number (e.g., several hundred) of remote wagering devices since the overall radio frequency (RF) bandwidth available for a casino is severely limited.

On the other hand, a cellular telephone-based approach to remote gaming being promoted by companies, such as Motorola, Inc., TRIMON Systems, Inc. and NuvoStudios, Inc., as disclosed, for example, in "NuvoStudios, Inc., Corporate Profile", NuvoStudios, Inc., October 2001 and "Mobile Casino Solution", TRIMON Systems, Inc., October 2001, does alleviate the issue of available radio frequency bandwidth. Yet, remote gaming on cellular telephones is functionally indistinguishable from gaming on the Internet. Although casinos are tempted by the lucrative prospects of Internet gaming, such as described in U.S. Pat. Nos. 5,800,268 to Molnick, 5,999,808 to La Due and 5,779,545 to Berg et al., the disclosed Internet wagering techniques cannot be directly transplanted into casino environment because of the vast differences between the security and integrity requirements of "brick-and-mortar" casinos and "click-and-mortar" casinos. While there is no conceivable motivation for an Internet player to sabotage his or her own personal computer (PC), telephone or mobile Personal Digital Assistant (PDA), an unscrupulous player will not hesitate to subvert a casino slot machine. In addition, a potentially unscrupulous player is thwarted from cheating on the Internet by the fear of violating a vast plethora of laws and regulations aimed to prevent wire fraud and credit card fraud. In comparison, the intra-casino operation of slot machines is typically outside of purview of such anti-fraud laws. Being functionally equivalent to gaming on stationary Internet terminals, wireless gaming on Internet-enabled phones and PDAs suffers from the same serious security and integrity deficiencies that are inherent in stationary Internet terminals.

In many modern electronic bingo systems, such as disclosed on the website having URL www.fortunet.com, players buy electronic and/or paper bingo cards at a point of sale terminal (such as described in our co-pending U.S. Patent Application No. 2003/0104865) that issues a sales receipt to a purchaser of bingo cards. The receipt typically includes a receipt identification number and may also include a barcode that uniquely identifies the receipt. The player then enters such an identification number into a bingo player unit, e.g., a wireless bingo player unit, and in response, the player unit relays the entered identification number to a central file server, which in its turn, downloads bingo cards corresponding to the receipt identification number into the player unit. However, the manual entry of the identification number by the player is error prone, cumbersome and not conducive to assuring the security and integrity of bingo cards sales by roving cashiers on the floor of the bingo hall. Moreover, the sales of bingo cards to players by roving cashiers are not currently tracked by any means and consequently, players lose the opportunity to earn player loyalty points for purchasing bingo cards on the bingo hall floor while bingo hall operators lose a valuable opportunity to track the purchasing activities of players.

SUMMARY OF THE INVENTION

It is the primary objective of the embodiments of the present invention to provide a casino player with an opportunity to securely play casino games, such as poker, slots, keno and bingo "on the go" without the need for a stationary video and/or reel slot machine.

It is a further objective of the embodiments of the present invention to provide a casino player with a secure method of playing a mobile casino game on a small device convenient for carrying on the person.

It is a further objective of the embodiments of the present invention to automate the process of renting such mobile wagering devices to players.

It is a further objective of the embodiments of the present invention is to automatically track mobile player devices rented to players to encourage the return of the devices to the casino.

It is yet another objective of the embodiments of the present invention to facilitate player tracking and simplify and make more reliable the process of downloading bingo card data into bingo player units.

These and further objectives will become apparent from the attached drawings and the following description of the preferred embodiment.

The above objectives are achieved through the embodiments of the present invention by providing a casino player with a wireless wagering device akin to a wireless PDA or an Internet-enabled cellular telephone. The preferred embodiment of a mobile wagering device, programmed to play typical casino games, including poker, slots, keno and bingo, incorporates a radio frequency transceiver, an infrared downloading port and a rechargeable battery. A player rents such a mobile player unit from the casino at a self-service dispensing kiosk. In order to rent a mobile player unit, a player inserts a player club card into the kiosk's magnetic card reader and deposit money into the kiosk's bill validator The kiosk houses a number of mobile player units in its storage and recharging cells. Each of the cells are networked over a local area network with a central PC-compatible computer controlling the kiosk.

When a player buys a pack of electronic bingo cards at a kiosk, the kiosk's central computer downloads the purchased bingo cards into an available player unit plugged into the internal local area network of the kiosk while the unit is housed in the kiosk. A player can then take the downloaded unit out of the kiosk to any location of the casino floor. Over a radio channel, the unit receives bingo data, such as bingo patterns and pseudo-random bingo numbers from the kiosk's central computer, and plays downloaded bingo cards automatically. The central computer automatically verifies all bingo cards downloaded into all rented mobile player units, detects winning bingo cards, computes the prizes due to the winning players and stores the outcomes of the games in an internal database. When a player re-inserts the player unit into the kiosk, the kiosk automatically dispenses any winnings due the player through a bill dispenser and/or coin hopper.

The central computer also maintains a database of the rented units and may award bonus points to players returning the rented units to the kiosk. A complete self-service rent-and-return cycle yields substantial labor costs savings for casinos. The kiosk is also equipped with electronic latches controlled by the central computer. The latches lock the unit inside the kiosk and prevent a player from taking the unit out of the kiosk without first paying for the unit.

A player having a sufficient account balance can also purchase, by means of radio communications, bingo cards with the help of the mobile player unit located on the casino floor. In order to prevent fraud and make radio communication with the unit secure, the central computer downloads an encryption key to each unit being rented. The encryption key is downloaded over the kiosk's internal local area network while the unit remains locked inside of the kiosk. Even though a radio communication can be easily intercepted, such an internal downloading of the encryption key assures security of the subsequent communications between the central computer and the rented unit over the public radio channel. As a result, a player can confidently place an order for purchasing bingo cards right from the casino floor in real time.

Moreover, secure gaming over a public radio channel authenticated by an encryption key downloaded at a dispensing kiosk opens an opportunity for playing "classic" casino games, such as poker and slots, on the very same mobile player unit. In this case, the player unit transmits authenticated encoded game requests, such as "deal a poker hand", "spin reels" and "draw keno balls", to the central computer. In response, the central computer broadcasts authenticated outcomes of the games determined by a software random number generator running on the central computer. The response received by the player unit determines the outcome of the game including winnings, if any, and a new credit balance. Each such request and response thereto are authenticated by digital signatures based upon a secure authentication key downloaded into the player unit from the central computer while the player unit remains inside the dispensing kiosk.

The objective of facilitating player tracking, and simplifying and making more reliable the process of downloading bingo card data into bingo player units is accomplished in one embodiment by imprinting a game ticket, such as a bingo card, with a first barcode and by affixing a barcode label carrying a second barcode to a game unit utilized by a player to play a gambling game, such as bingo, and additionally, by reading said first and said second barcodes via a barcode reader, such as a wireless barcode reader, and transmitting said first and second read barcodes to a central game server that processes said received first and second barcodes to derive gaming data pertinent to said game ticket, such as bingo numbers of said bingo card, and subsequently, transmits said game data to said game unit which processes said game data and displays results of the processed game data to a player operating said game unit.

Other variations, embodiments and features of the present invention will become evident from the following detailed description, drawings and claims.

BRIEF DESCRIPTION OF THE DRAWINGS

The invention is illustrated by the following drawings:

FIG. 5 illustrates a status table of the embodiments of the present invention;

FIG. 12 (*b*) illustrates a "spin request" data block of the embodiments of the present invention;

FIG. 12 (*c*) illustrates a "deal request" data block of the embodiments of the present invention;

FIG. 12 (*d*) illustrates a "draw request" data block of the embodiments of the present invention;

FIG. 13 (*b*) illustrates a "service response" data block of the embodiments of the present invention;

FIG. 17 (*b*) illustrates a "draw" data block of the embodiments of the present invention;

FIG. 18 (*b*) illustrates an infrared communication via a local area network of the embodiments of the present invention;

DETAILED DESCRIPTION

Figure 1:
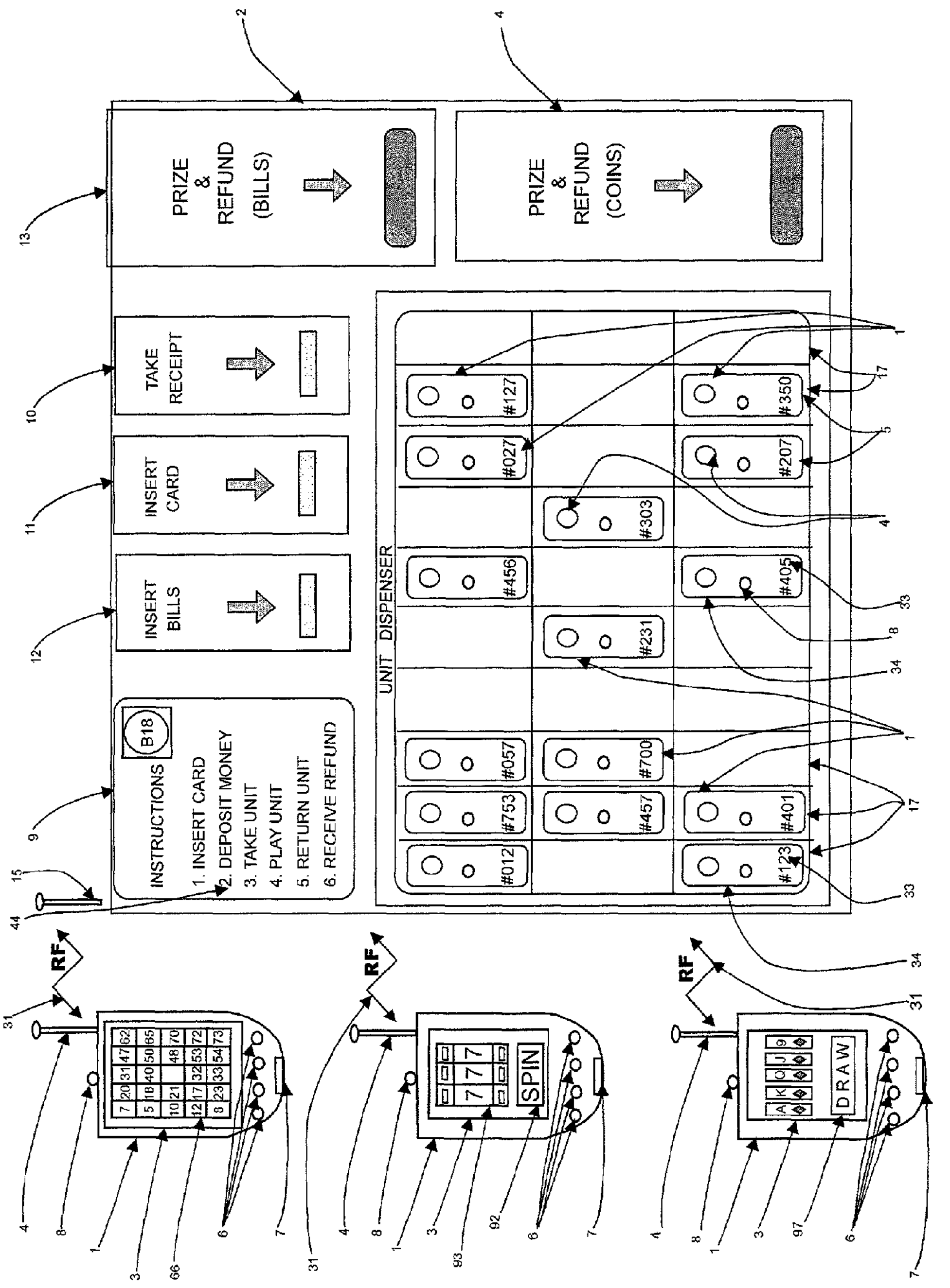
FIG. 1 illustrates a block diagram of the preferred embodiment of the present invention.

As illustrated in FIG. 1, a preferred embodiment of the present invention includes two main elements, namely, a mobile player unit (MPU) 1 and a unit dispenser kiosk (UDK) 2. Specifically, FIG. 1 shows three mobile player units 1 located outside dispenser kiosk 2 and fifteen mobile player units 1 located inside kiosk 2. It is presumed that mobile player units 1 located outside of kiosk 2 are rented to players and that the units 1 located inside kiosk 2 are generally available for rent. The rented units 1 are shown with their touchscreen liquid crystal displays (LCD) 3 facing the reader and with their radio-frequency (RF) antennae 4 extended, whereas mobile player units 1 inside kiosk 2 are shown positioned on their sides 5 with antennae 4 retracted into respective units 1. FIG. 1 also illustrates that MPU 1 is equipped with control pushbuttons 6, a charger and communications connector 7 and a "UNIT READY" light emitting diode (LED) 8. LCD 3 of a first rented unit 1 displays an image of a bingo card, while LCD 3 of a second rented unit 1 displays an image of slot reels, and LCD 3 of a third rented MPU 1 displays an image of poker cards. Although only a few mobile player units 1 are shown in FIG. 1, a typical casino is expected to have hundreds of rental MPU 1 available for its patrons and is expected to be equipped with several UDKs 2 networked together.

Being a combination kiosk-type dispenser of MPUs 1 with a central game controller, UDK 2 includes an assortment of conventional point-of-sale and automatic-teller-machine components, including a touchscreen video monitor 9, a receipt printer (PRT) 10, a magnetic card reader (MCR) 11, a bill validator/barcode-reader (BV) 12 a bill dispenser (BD) 13 and a coin dispenser CD 14. In addition, UDK 2 incorporates a RF antenna 15 being a part of an embedded RF transceiver 16 shown explicitly in FIG. 2. The UDK 2 includes a plurality of storage cells 17. Each storage cell 17 is capable of housing one MPU 1. In addition, each storage cell 17 is capable of recharging and communicating with the MPU 1 housed therein. Specifically, FIG. 1 shows thirty cells 17 arranged in three rows of ten cells 17 each. Some illustrated cells 17 are occupied by units 1 and some cells 17 are empty as some MPUs 1 have been rented. Although FIG. 1 explicitly shows only thirty storage cells 17, a typical UDK 2 may incorporate more or less than thirty cells 17.

Figure 3:
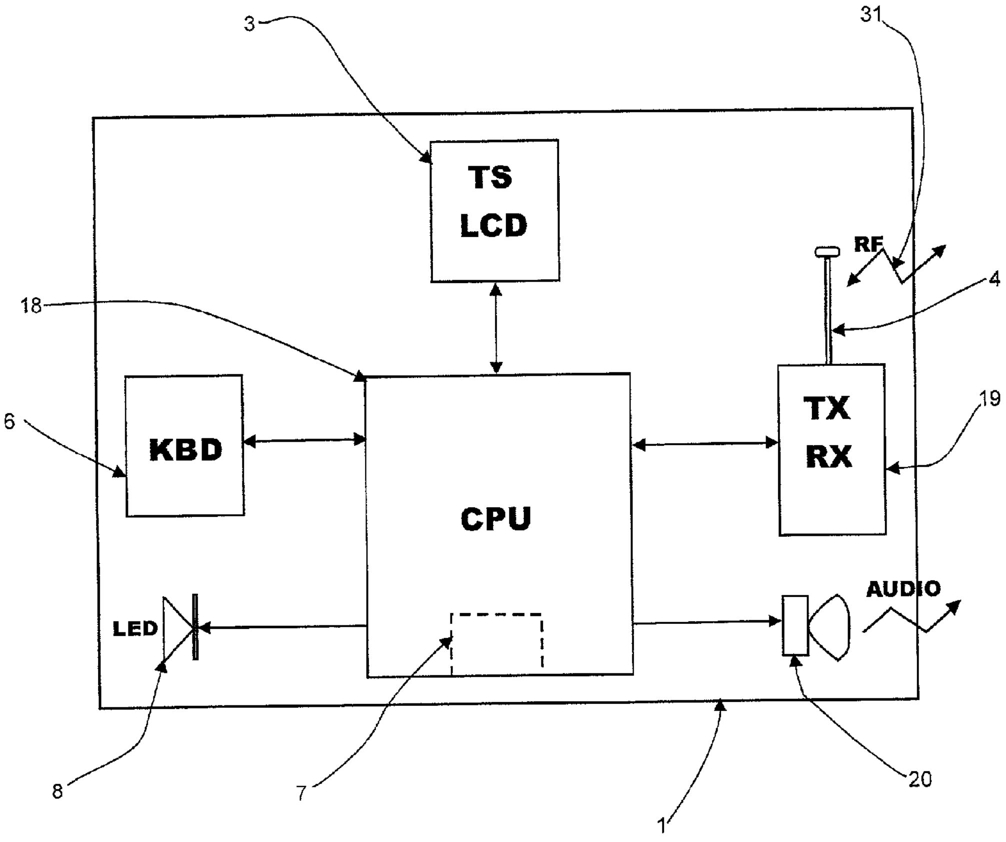
FIG. 3 illustrates a block diagram of a player unit of the embodiments of the present invention.

The internal design of an MPU 1 is illustrated in FIG. 3. Being essentially a wireless PDA, unit 1 incorporates touchscreen LCD 3, antenna 4, LED 8, connector 7, control buttons 6, a programmable microprocessor 18, such as a Dragon-Ball-Z® microprocessor, a spread-spectrum RF transceiver 19, such as a BlueTooth® transceiver and a speaker 20. Also incorporated within the internal design of an MPU 1, but not shown explicitly in FIG. 3, are conventional dynamic and non-volatile memory and a rechargeable battery.

Figure 2:
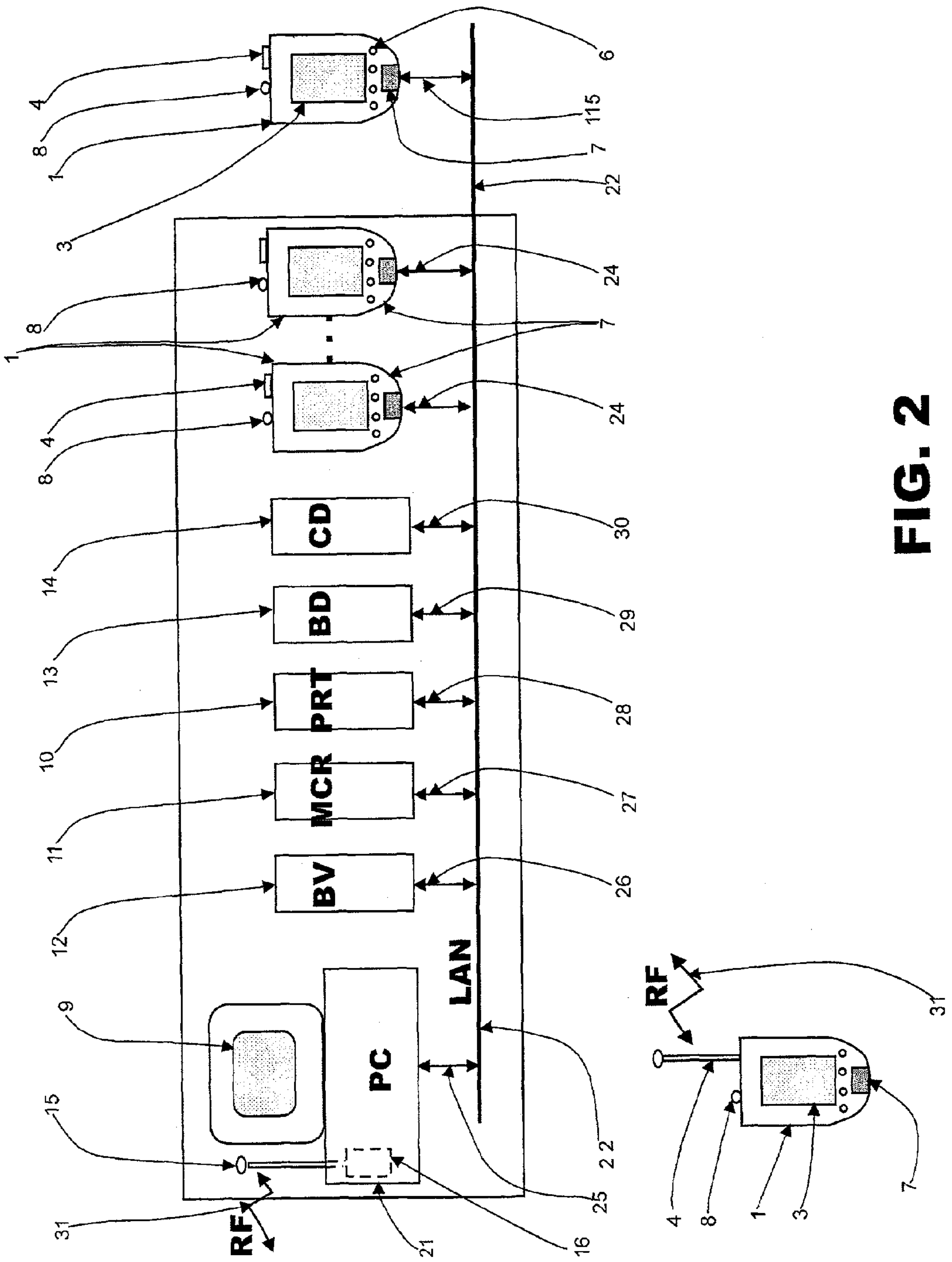
FIG. 2 illustrates a local area network of the embodiments of the present invention.
Figure 4:
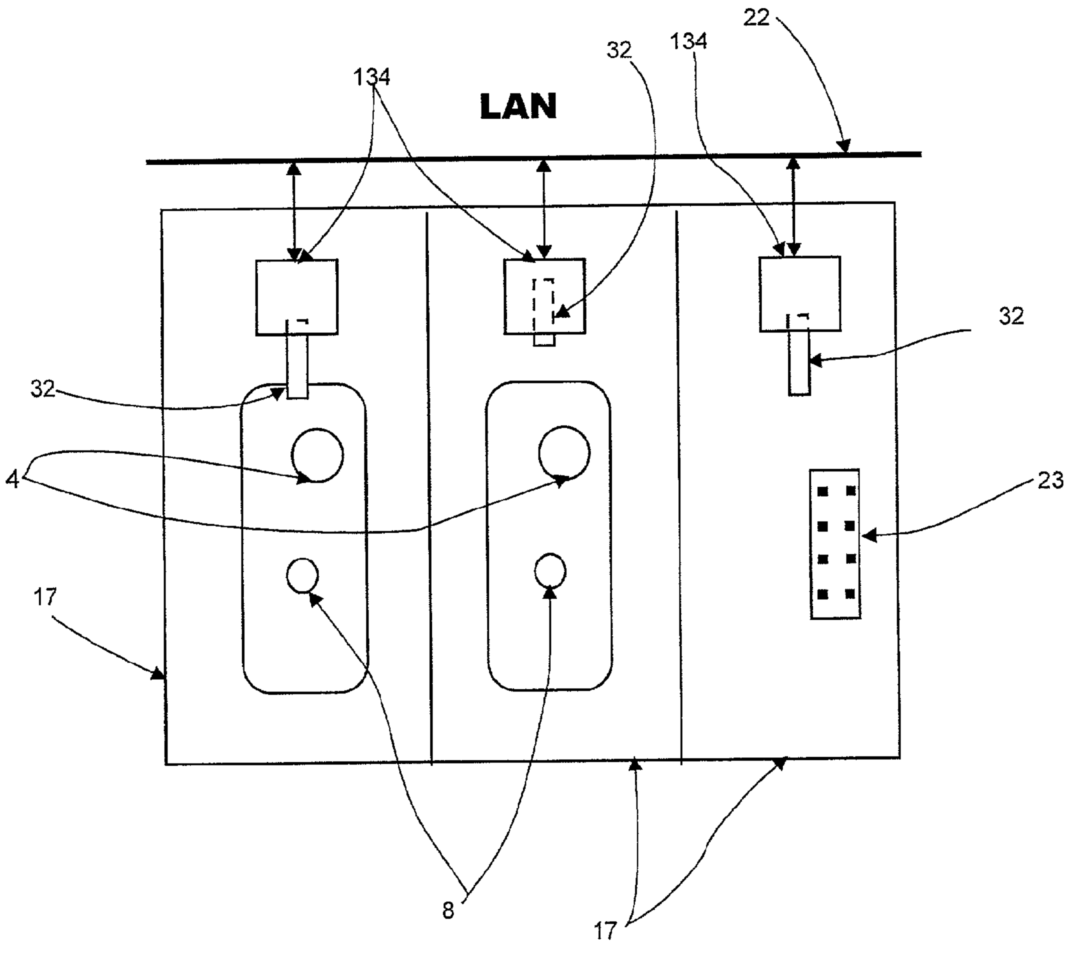
FIG. 4 illustrates a locking mechanism of the embodiments of the present invention.

The internal design of UDK 2 is detailed in FIG. 2. Architecturally, UDK 2 is a local area network (LAN) 22 governed by a conventional personal computer (PC) 21. The internal components of UDK 2 are interfaced with each other via LAN 22. In particular, PC 21, BV 12, MCR 11, PRT 10, BD 13, and CD 14 are permanently plugged into LAN 22. An MPU 1 temporarily occupying cell 17 is interconnected with LAN 22 via its own connector 7 and a mating charging and communication connector 23 on the end of cable 24 that forms a branch of LAN 22. Connector 23 is built into cell 17 as shown in FIG. 4. LAN 22 also includes cables 25 through 30 forming branches of LAN 22 interfacing respectively with PC 21, BV 12, MCR 11, PRT 10, BD 13 and CD 14. In addition, LAN 22 is wirelessly interfaced with rented MPUs 1 via a spread-spectrum RF channel 31, preferably, a public domain RF channel. More specifically, PC 21 incorporates a spread-spectrum transceiver 16 (shown in dashed lines) identical to the spread-spectrum transceiver 19 of MPU 1 and an antenna 15 identical to the antenna 4 of MPU 1. Via transceivers 16 and 19 and antennae 4 and 15, LAN 22 is wirelessly interfaced with MPU 1 over a spread-spectrum RF channel 31.

FIG. 4 illustrates three neighboring cells 17 of UDK 2. The leftmost cell 17 and the central cell 17 are occupied by MPUs 1, whereas the rightmost cell 17 is empty. As shown in FIG. 4, each storage cell 17 includes a battery charger and communications connector 23, for mating with connector 7 of MPU 1, and an electromechanical lock formed by a spring-loaded solenoid 134 (the spring is not explicitly shown in FIG. 4.) having a solenoid rod 32. The leftmost cell 17 shows solenoid 134 in a deactivated state with its rod 32 being forced out by the spring and, consequently, MPU 1 being locked inside the leftmost storage cell 17. The central storage cell 17 shows solenoid 134 in an active state with its rod 32 retracted and, consequently, MPU 1 being released. The mechanics of solenoid 134 are such that its rod 32 allows for easy insertion of MPU 1 into cell 17 but precludes removal of MPU 1 from cell 17 without activation of solenoid 134. Although not shown explicitly, each storage cell 17 also includes charging circuitry for charging MPU 1 while it is inserted into storage cell 17.

Via LAN 22, PC 21 periodically polls all cells 17 of UDK 2 to determine whether they are occupied and, if so, by which MPU 1. Note that each MPU 1 is characterized by its unique manufacturer's identification number 33 stored in its non-volatile memory and further etched on the top surface 34 of MPU 1 as shown in FIG. 1. In particular, PC 21 periodically sends a test data block to each occupied cell 17 via respective communication connectors 23 and 7. In response to the received test block, MPU 1 residing in a particular cell 17 sends an acknowledgment containing its manufacturer's identification number 33 to PC 21 via embedded connector 7. The conventional details of the test and acknowledgment data blocks flowing between MPU 1 and PC 21 are omitted herewith as they are well known to practitioners of the art. Once PC 21 receives a positive acknowledgment from MPU 1, it marks, in its memory, the respective cell 17 together with MPU 1 residing therein as available for dispensing to a player. Specifically, PC 21 maintains in its memory a status table 35 illustrated in FIG. 5. The status table 35 details the current status of each cell 17, each MPU 1 and each casino patron renting an MPU 1. Each row of table 35 presents status of an individual cell 17. Specifically, the first group 36 of thirty rows represents the current status of thirty individual cells 17. The individual cells 17 in table 35 are indexed by the cell identification number 37. The top leftmost cell 17 of FIG. 1 is identified as cell number one (1) and the bottom rightmost cell 17 of FIG. 1 is identified as cell number thirty (30). For each storage cell 17, table 35 indicates the manufacturer's identification number 33 of mobile player unit 1 housed therein and the current status 38 of MPU 1 located in the cell 17. The current status of each MPU 1 stored in a cell 17 is indicated by status flag 38 that is equal to one, if respective cell 17 houses an MPU 1 ready for dispensing, and is equal to zero otherwise.

Figure 6:
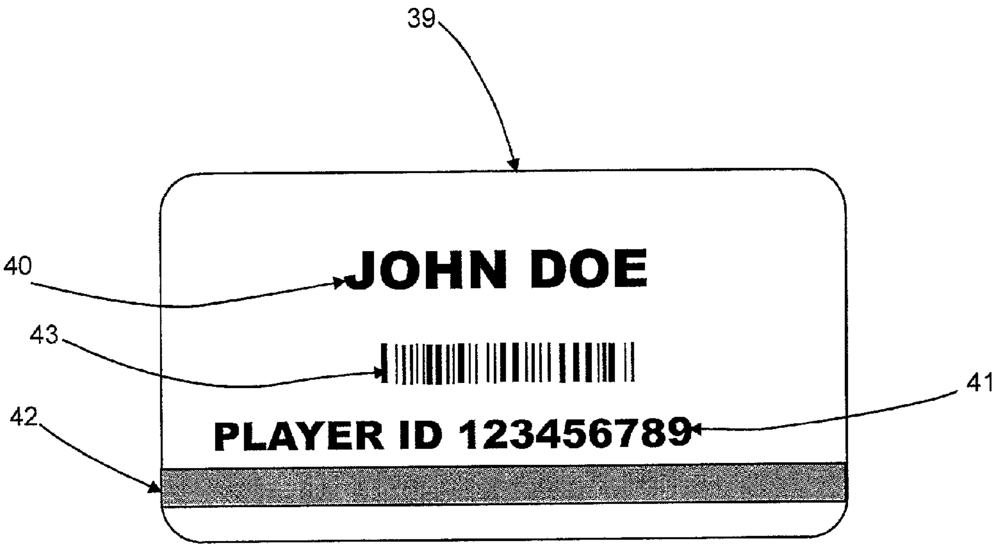
FIG. 6 illustrates a player-tracking card of the embodiments of the present invention.

Players rent MPUs 1 from UDK 2 and return MPUs 1 to UDK 2 once they complete playing. In order to rent an MPU 1 from UDK 2, a player is preferably required to first insert into MCR 11 a player tracking card 39 as illustrated in FIG. 6, otherwise no MPU 1 should be dispensed by UDK 2 to the player. Along with a player's name 40, card 39 bears a player's identification number 41. For purposes of brevity, a player having identification number 41 may simply be called player 41 throughout the remainder of the disclosure. The name 40 and identification number 41 may also be encoded in a magnetic form on magnetic strip 42 and may also be available in a barcode format 43. In order to rent a player unit, a player must, in addition to inserting player card 39 into MCR 11, also deposit money into BV 12.

Figure 7:
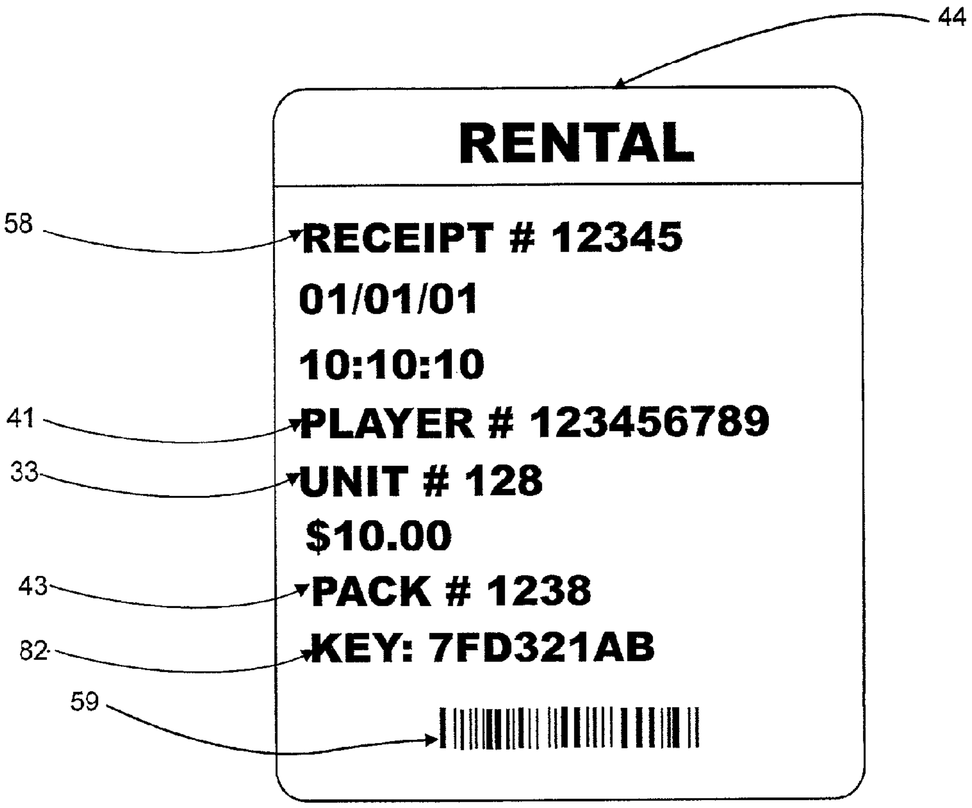
FIG. 7 illustrates a rental receipt of the embodiments of the present invention.

Initially, in order to facilitate the description of the operation of the system, a simple case of a player renting an MPU 1 to play a prepackaged set of electronic bingo cards ("pack") is considered. For example, it is assumed that a casino offers players only one type of bingo packs and allows players to buy only one pack. A specific bingo pack sold to a player 41 is identified on a rental receipt 44 issued by PRT 10 as illustrated in FIG. 7. Note that manufacturers of paper and electronic bingo packs design their packs in such a way that each bingo pack contains predetermined bingo cards and each bingo pack is identifiable by its manufacturer's pack identification number 100. To determine each and every bingo card to be played by player 41 in each and every bingo game of a bingo session for which pack 43 is intended, it is sufficient to know the pack identification number 100. The reverse is also true where duplicate bingo cards are not allowed in any game.

Figure 8:
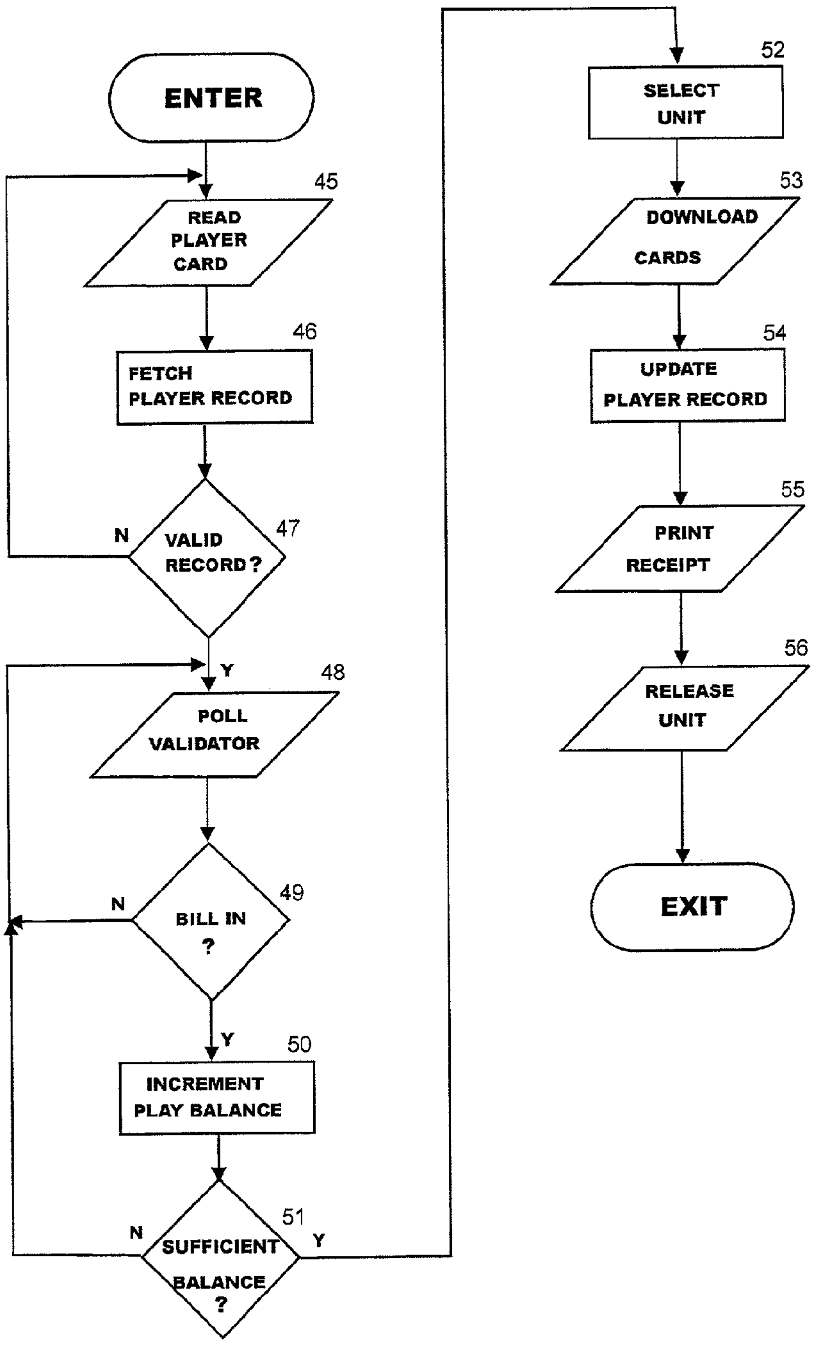
FIG. 8 illustrates a flowchart of a "dispense unit" task of the embodiments of the present invention.

The operations being performed by PC 21 of UDK 2 in this simplified case are illustrated in the flowchart of FIG. 8 illustrating a "dispense unit" task. Note that PC 21 operates in a multitasking environment, such as Linux®, and executes multitasking applications software. In accordance with the instructions 120 displayed on the touchscreen monitor 9, a player starts by inserting a player card 39 into magnetic card reader 11. MCR 11 detects the inserted player card 39 and transfers a player identification number 33 over LAN 22 to PC 21 as illustrated by the step "READ PLAYER CARD" 45 of the flowchart in FIG. 8. Subsequently in the step "FETCH PLAYER RECORD" 46, PC 21 attempts to fetch the current player record by matching the read-in player identification number 33 from the status table 35. Techniques of searching databases are well known in the industry and, therefore, not described in detail herein. If as a result of the test "VALID RECORD?" 47, a matching record is not found in table 35, PC 21 returns to step 45 of reading player card 39. If test 47 is passed successfully, PC 21 begins to poll BV 12 in step "POLL VALIDATOR" 48. If a bill is indeed inserted, then the test "BILL IN?" 49 is deemed successful, and the player's balance 57 that is stored in status table 35 is incremented according to the denomination of the bill in step "INCREMENT PLAYER'S BALANCE" 50. Assuming the resulting balance 57 is sufficient to purchase a bingo pack, the test "SUFFICIENT BALANCE?" 51 is satisfied and PC 21 proceeds to the next step "SELECT UNIT" 52, otherwise PC 21 loops back to step 48. Excess deposited funds, if any, are credited to player's account balance 57. While performing step "SELECT UNIT" 52, PC 21 scans table 35 and finds the next available MPU 1 ready for operation. The located MPU 1 is downloaded with purchased electronic bingo cards in the step "DOWNLOAD CARDS" 53. As techniques of downloading electronic player units with bingo cards are well known in the industry, they are omitted herein. Instead, it is emphasized that bingo cards are downloaded into MPU 1 via a secure, private communication channel formed by connectors 7 and 23. Note that communications via connectors 7 and 23 are not susceptible to interception, whereas communications via public radio channel 31 can be easily intercepted. Subsequently, PC 21 updates a record of player 41 (more exactly, a player having identification 41) in status table 35 in the step "UPDATE PLAYER RECORD" 54. In particular, PC 21 updates a player's credit balance 57 to reflect the payment for the purchased bingo pack 43 and also links the record of player 41 with the manufacturer's identification number 33 of MPU 1 downloaded with pack 43. At this point, PC 21 causes PRT 10 to print rental receipt 44 including player identification number 41, identification number 33 of the rented MPU 1, identification number of the downloaded pack 43, receipt identification number 58 and receipt identification barcode 59. Barcode 59 uniquely encodes the information printed on receipt 44. PRT 10 prints receipt 44 in a format compatible with the built-in barcode reader of BV 12 so that the BV 12 can read barcode 59. Lastly, PC 21 activates solenoid 134 of the cell 17 containing the downloaded MPU 1 in the step "RELEASE UNIT" 56 as is illustrated by the central cell 17 in FIG. 4. Now, a player can remove MPU 1, carrying the downloaded information, from a respective cell 17. In order to assist the player in finding the MPU 1, the MPU 1 starts blinking its LED 8 as soon as it detects the end of the process of downloading of, via connectors 7 and 23, pack 43 by PC 21.

Once player 41 removes MPU 1 from UDK 2, PC 21 transfers the identification number 33 of the removed MPU 1 from the first 30 rows 36 of table 35 to the group of records 70 that lists "homeless" MPUs 1 (i.e., units not housed in any specific cell 17 and, presumably, located somewhere on the casino floor). As illustrated in FIG. 5, each "homeless" unit listed in group 70 however is "temporarily owned" by a specific player 41 and visa versa each player 41 becomes linked by PC 21 with a specific MPU 1 having a specific identification number 33. Note that the last group of records in table 35, namely group 133, is essentially a player club database that stores a player's remaining balances 57 and bonus points 68 once the player returns a MPU 1 to UDK 2.

Figure 9:
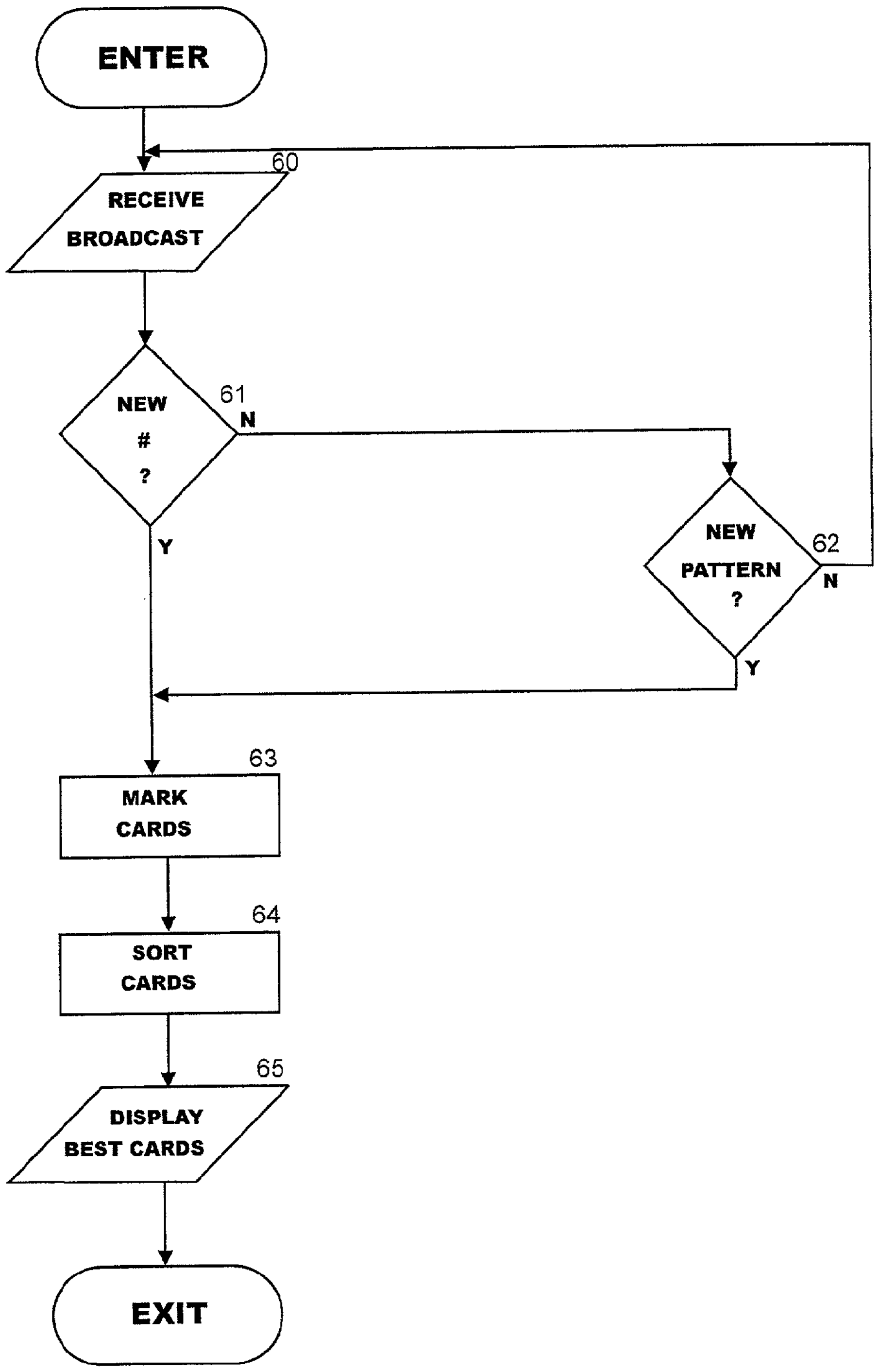
FIG. 9 illustrates a flowchart of a "verify" task of the embodiments of the present invention.

Once removed from UDK 2, a player can carry a rented MPU 1 anywhere through a casino and, as long as MPU 1 receives bingo data over RF channel 31, it will play bingo automatically as illustrated in the flowchart of FIG. 9 illustrating a "verify" task. Specifically in the step "RECEIVE BROADCAST" 60, MPU 1 receives bingo data, such as called bingo numbers and bingo patterns, broadcast by UDK 2 to all MPUs 1 via antenna 15. Note that the broadcast data does not have to be encrypted because it is not necessary to encode publicly known data, such as called bingo numbers and bingo patterns being played. In particular, MPU 1 checks for new called bingo numbers in the test step "NEW #?" 61 and for new bingo pattern in the test step "NEW PATTERN?" 62. Should any new data be discovered, MPU 1 marks electronic bingo cards in its memory in accordance with the received new data in the step "MARK CARDS" 63. Otherwise, MPU 1 loops back to step 60. Once MPU 1 marks cards, it sorts the marked bingo cards in accordance with their closeness to winning and displays the best bingo cards on its screen 3 in the step "DISPLAY BEST CARDS" 65. In particular, if MPU 1 detects a card that achieved bingo, MPU 1 immediately displays the winning card 66 on touchscreen 3 and continuously blinks card 66 to attract a player's attention. In addition, MPU 1 may play a winning tune through speaker 20.

The data broadcast by UDK 2 over antenna 15 originates at PC 21. PC 21 stores a schedule of bingo games or patterns to be played in its memory in a conventional way. PC 21 also utilizes a standard random number generation utility to generate randomly called bingo numbers. As an alternative, a conventional ball hopper or bingo rack may be used to generate random bingo numbers. PC 21 also automatically verifies all sold bingo cards (i.e., bingo cards downloaded in each rented MPUs 1), with each new called bingo number in order to detect a winning card as taught by U.S. Pat. No. 5,951,396 to Tawil and is further disclosed in applicants' co-pending U.S. Patent Application No. 60/241,982 entitled "Fully Automated Bingo Session." Once a winning card is detected, PC 21 algorithmically computes the identification number 100 of bingo pack 43 that the winning bingo card was downloaded to. Knowing the winning pack number 43, PC 21 finds the winning player corresponding to the manufacturer's identification number 33 by searching status table 35. Once the winning player is found, PC 21 updates the player's balance 57 to reflect the winning prize.

Figure 10:
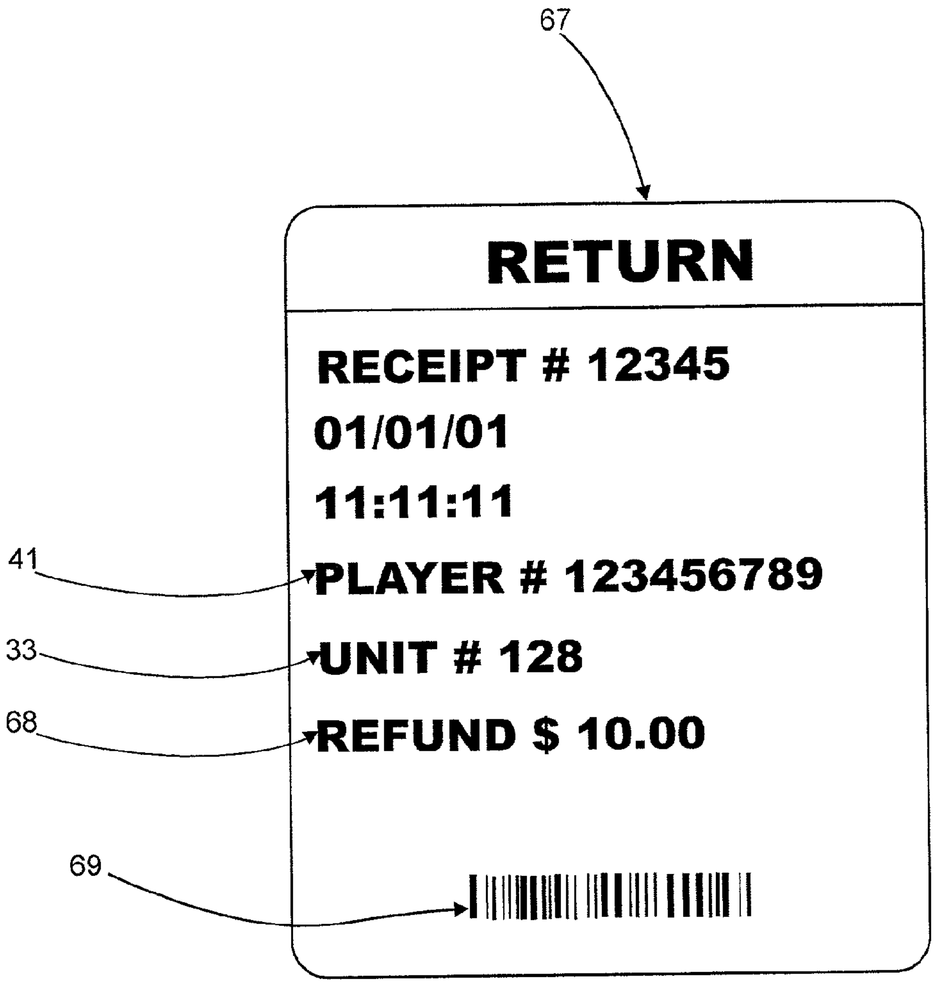
FIG. 10 illustrates a return receipt of the embodiments of the present invention.

Meanwhile, the winning MPU 1 independently detects a winner as described above and starts blinking the winning card 66 on display 3 and optionally plays a winning tune through speaker 20. At this point, a winning player may approach UDK 2 and claim a prize by inserting the winning MPU 1 back into UDK 2. A player may insert MPU 1 into any empty cell 17. PC 21 detects the insertion of MPU 1 through cell 17 polling procedure described above. Upon learning the physical identification number 33 of the inserted MPU 1, PC 21 searches status table 35 and fetches the identification number 41 of the player who rented the unit and also fetches the player's account balance 57 from table 35. The account balance 57 includes the player's winnings as described above. Now PC 21 causes BD 13 and CD 14 to dispense the player's balance due. Specifically, BD 13 dispenses the dollar amount of the player's balance 57 and CD 14 dispenses the remaining amount, if any, of cents in coins. Once dispensing of the balance 57 is complete, PC 21 clears balance 57 in player's 41 record in table 35 and also clears MPU 1 manufacturer's identification field 33. The operation of clearing field 33 releases player 41 from any responsibility for the returned MPU 1. As a courtesy to the player, PC 21 also causes PRT 10 to issue a return receipt 67 illustrated in FIG. 10, wherein 68 is the refund value, if any, and 69 is the barcode that uniquely identifies and verifies return receipt 67.

Optionally, a player may also be required to insert the barcoded receipt 44 into BV 12 and/or insert the player card 39 into magnetic card reader 11. If such an option is selected, then BV 12 reads barcoded identification 59 of receipt 44 and/or magnetic card reader 11 reads-in player identification number 41 from card 39, and PC 21 compares read-in identifications 59 and/or 42 of receipt 44 and/or card 39 with the values stored in table 35. Assuming they match with the read-in identification 33 of MPU 1 stored in the player's 41 record in table 35, the validity of the winning claim is well-established. Some casinos may even elect to rely exclusively on the validation of receipt 44 and/or card 39 for purposes of paying winners without the requirement of returning the winning MPU 1 into UDK 2. However, the preferred requirement of returning the winning MPU 1 decreases the casino's labor costs since casino employees will not have to retrieve and return MPUs left all over the casino. Also, it insures that MPUs 1 are readily available for new players to rent. Moreover, it prevents a player from taking a MPU 1 home as a "souvenir" or the like. For all such reasons, it makes sense for a casino to require all players to return all rented MPUs 1 to UDK 2 once a player is finished. A casino is in a position to enforce the return of the MPUs 1 because status table 35 contains detailed records of MPUs 1 rented by players. However, instead of enforcing the return of MPU 1, a casino may encourage a voluntary return by, for example, awarding a player's account bonus points 68 upon the return of the rented MPU 1. A player may use the bonus points 68 as discounts for buffets, souvenirs, etc. Also, a casino may impose a deposit fee for renting MPU 1 and refund the deposit to the player through dispensers 13 and/or 14, once a player returns the MPU 1.

The primary reason the above-described MPU 1 is equipped with RF-channel 31 is to facilitate automatic playing of bingo on the casino floor. However, some players and some casinos prefer manual entry of all necessary bingo data into the MPUs 1 as described, for example, in U.S. Pat. No. 4,378,940 to Gluz et al., and the article "Bingo Playing Enhanced With New Innovations", Bingo Manager, July, 2001. If manual entry is required, the MPU 1 does not have to be equipped with transceiver 19 and antenna 4 resulting in a less expensive MPU 1. However, even in such a simplified case, the UDK 2 is still very useful since it completely automates the process of selling electronic bingo cards and yields substantial labor costs savings for casinos and bingo halls.

Figure 11:
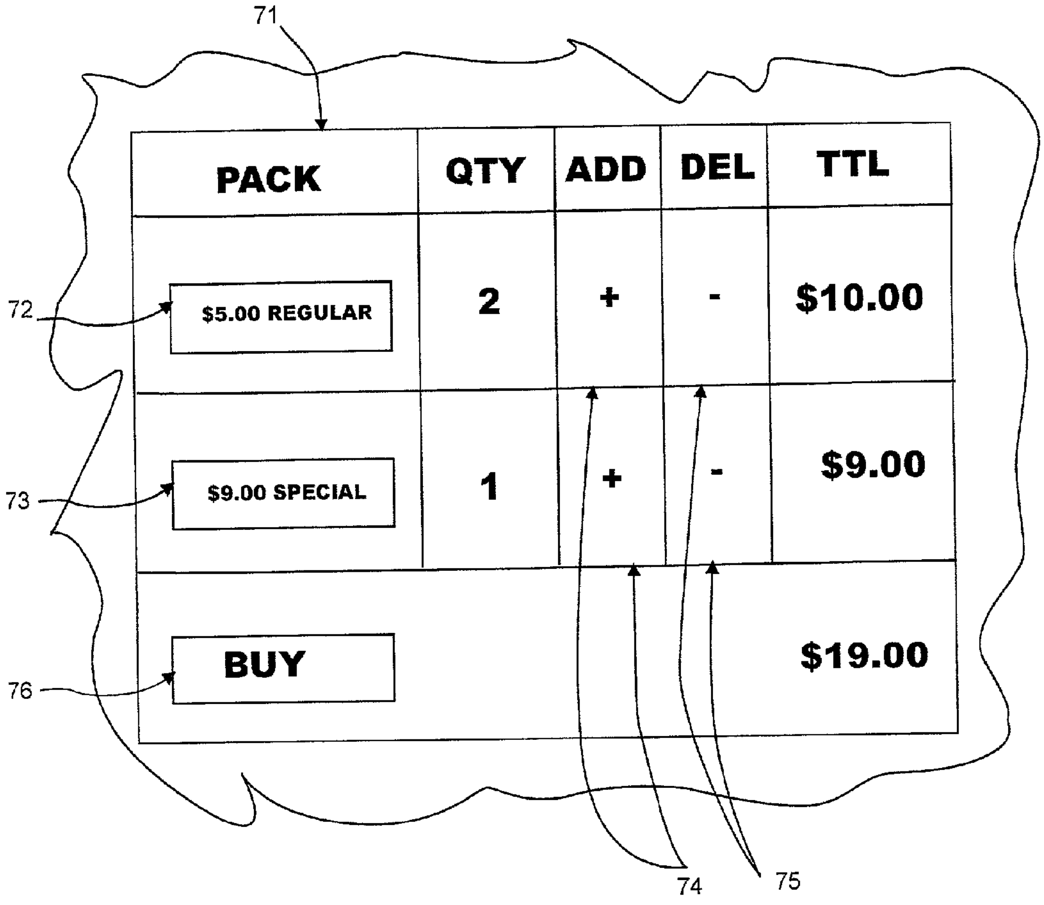
FIG. 11 illustrates a "buy pack" window of the embodiments of the present invention.

The aforementioned simple example of the system illustrated in FIG. 1 presumes that a player purchases only one specific bingo pack 43. However, being equipped with touchscreen 9, UDK 2 can offer a player a choice of types and quantities of packs as illustrated in FIG. 11 showing a window 71 on touchscreen 9. Window 71 displays an example of a menu of choices available to the player. Specifically, by touching button 72, a player can select a "REGULAR" pack costing $5.00 and by pressing button 73, a player can select a "SPECIAL" pack costing $9.00. Touchbuttons "+" 74 and "–" 75 allow a player to increase and decrease respectively the number of packs to purchase. Finally, touchbutton "BUY" 76 allows a player to actually place a purchase order. PC 21 processes the player's purchase order in a conventional manner.

Figure 12:
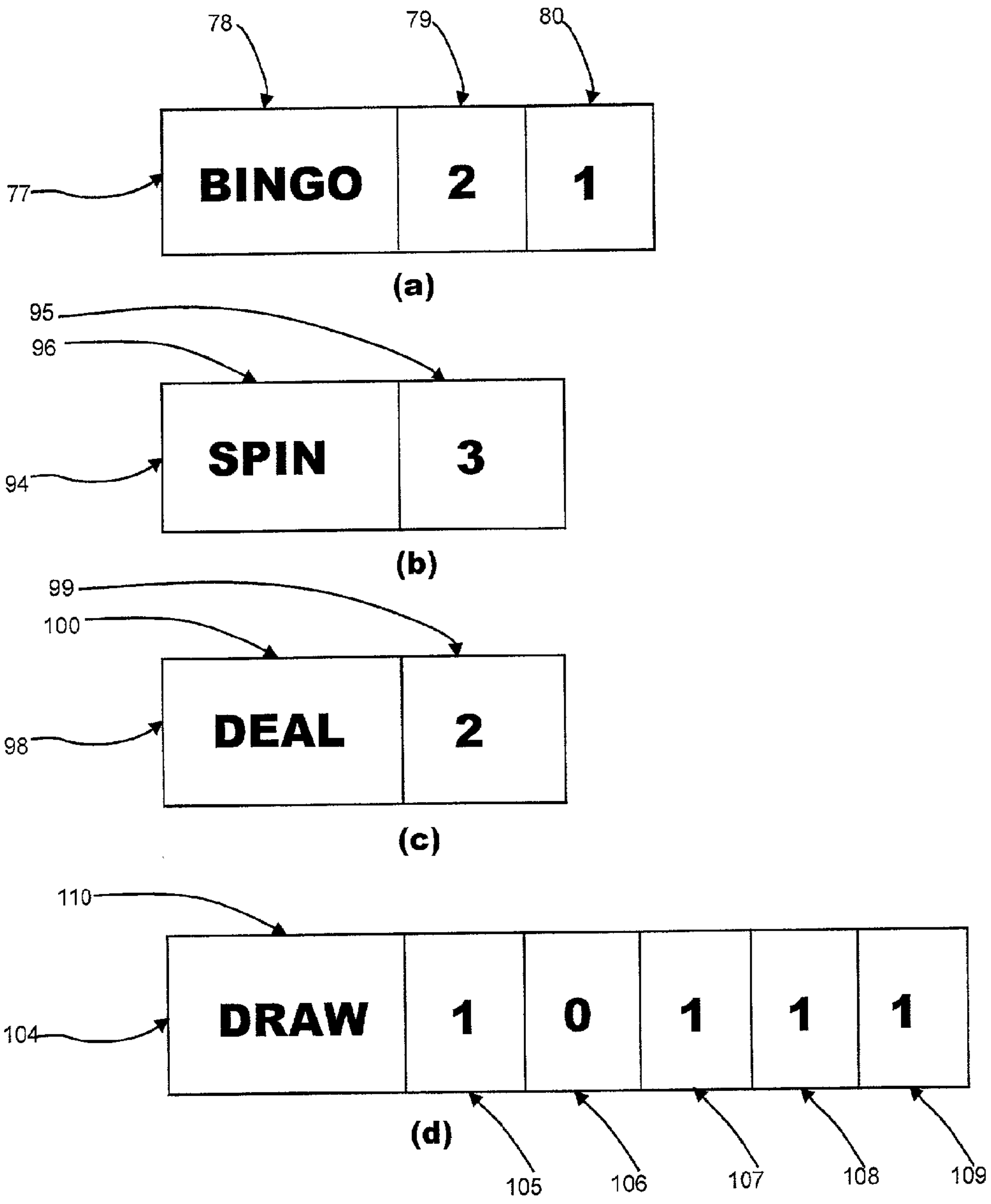
FIG. 12 (*a*) illustrates a "bingo request" data block of the embodiments of the present invention.

To this point, it was assumed that bingo packs 43 are to be purchased by the player at the UDK 2 when the player rents MPU 1. This is acceptable in the case of bingo games organized in sessions of one hour or more. However, in the case of so-called continuous bingo wherein players buy bingo cards for each game separately and may, for example, play some games while skipping other games, it is inconvenient for a player to buy bingo cards at UDK 2 separately for each game. It is therefore desirable to allow a player to purchase bingo packs on the casino floor, through MPU 1 that has an inherent capability of two-way radio communication via transceiver 19. For example, touchscreen 3 of MPU 1 can display the same menu 71 illustrated in FIG. 11 as the touchscreen 9 of UDK 2. Once a player completes the purchase order by pressing "BUY" button 76, MPU 1 can send a request to purchase electronic bingo cards to UDK 2 via RF channel 31. In particular, MPU 1 can send a "bingo request" data block 77 illustrated in FIG. 12(*a*) wherein, a data field "BINGO" 78 signifies that the present request is to purchase bingo packs, the next field 79 specifies the number of regular packs to purchase and the last field 80 specifies the number of special packs included in the purchase. Upon receiving a purchase request 77 from MPU 1, PC 21 fetches from status table 35 a record corresponding to the identification number 33 of MPU 1 and checks the current account balance 57 of the player for sufficiency of funds to cover the request 77. Assuming sufficient funds are available, UDK 2 transmits purchased electronic bingo cards to MPU 1 via RF channel 31 rather than downloading purchased bingo cards via connectors 7 and 23. PC 21 also decrements account balance 57 by the amount of the order.

However, there is a serious concern with the direct two-way RF communication between MPU 1 and UDK 2. Specifically, such a communication over open RF channel 31 can be easily intercepted. The lack of security can be resolved by encrypting such communications with the help of a private encryption key that is generated by UDK 2 and downloaded into MPU 1 via a secure route formed by connectors 7 and 23. Specifically, in addition to, and/or instead of bingo cards, PC 21 can download MPU 1 with at least one random digital security key to secure the two-way radio communications between MPU 1 and UDK 2. Such a digital security key is typically known in the industry under a variety of names (e.g., a digital encryption key, DES key, an authentication key, a private key, a digital signature key, a hashing algorithm, etc.) Importantly, MPU 1 is downloaded with a new unique random encryption key each time MPU 1 is rented and, therefore, even if the same player 41 accidentally rents the same MPU 1 having the same identification number 33, the downloaded encryption key is different every time. Optionally, the downloaded security key may be printed on sale receipt as is illustrated in FIG. 7 wherein the numeral 82 denotes a security or encryption key. Although an explicit printing of security key 82 may potentially result in complications in the case where a player loses receipt 44, a "spelled-out" key 82 facilitates auditing procedures and increases a player's trust in the fairness of gaming conducted by the casino.

Figure 13:
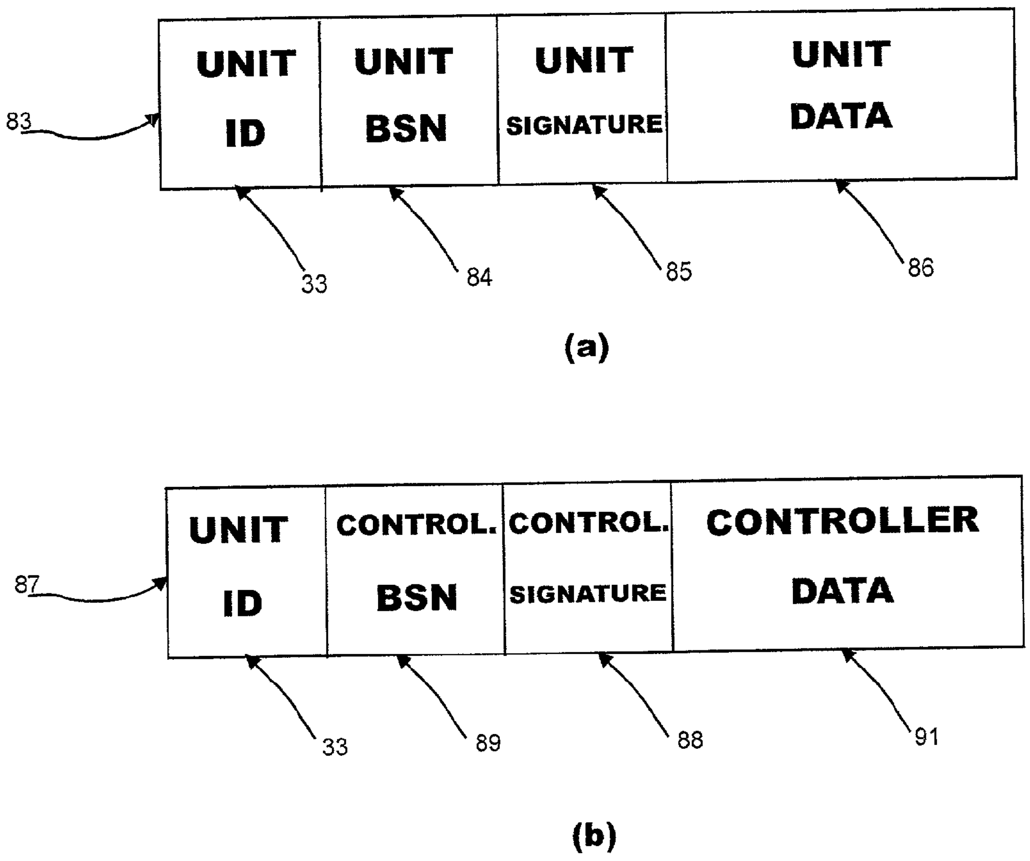
FIG. 13 (*a*) illustrates a "service request" data block of the embodiments of the present invention.

A random encryption key 82 is generated by PC 21 with the help of random number generation software utility in a conventional way. The details of the generation and utilization of key 82 are omitted herein since techniques of data encryption are well known in the industry and are disclosed in numerous publications including, for example, U.S. Pat. Nos. 4,670,857 to Rackman, 5,643,086 to Alcorn et al., 6,071,190 to Weiss et al., and 6,149,522 to Alcorn et al. Instead, it is re-emphasized that PC 21 downloads MPU 1 with a security key 82 over a secure communication channel formed by cable 24 and connectors 7 and 23 and that the security key 82 changes with every downloading. Being downloaded with a security key 82, MPU 1 can send authenticated data blocks to UDK 2 over the public radio frequency channel 31. Specifically, each such data block is authenticated with the help of a digital signature based on the security key 82 as illustrated in FIG. 13. Similarly, each data block MPU 1 receives from UDK 2 over the public RF channel 31 is also authenticated with the help of a digital signature based on the security key 82 as illustrated in FIG. 13.

Specifically, FIG. 13 (*a*) shows a "service request" data block 83 originating at MPU 1 on the casino floor. The data block 83 starts with manufacturer's identification number 33 of MPU 1 followed by a block sequence number 84 followed by a digital signature 85 and ending with a data field 86. Typically, block sequence number 84 is incremented with each new block sent by MPU 1. In the specific case under consideration, data field 86 is a request to purchase bingo cards 77 illustrated in FIG. 12 (*a*). Importantly, authentication field 85 is generated by MPU 1 as a predetermined function of at least one of the fields 33, 84 or 86 using a security key 82 downloaded by PC 21 into MPU 1 over connectors 7 and 23. Due to authentication field 85, the entire data block 83 is secure even though some portions of the data block (e.g., 33, 84 and 86) may not be secure. Therefore, an unscrupulous player cannot advance a false claim that he or she did not play a particular game that resulted in a loss or that he or she won a large prize since no other player can realistically send out a properly authenticated data block 83. Also, given a sufficiently long authentication field 85 (e.g., five hundred and twelve bits), spurious radio frequency noise cannot realistically produce a false request by a player's MPU 1. Similarly, a "hacker" who does not know the true security key 82 cannot send a false game request in the place of a legitimate player. In summary, the casino is protected from false claims that might otherwise be advanced by cheats and "hackers" and players are more confident that gaming in the casino is fair and secure.

Each response block 87 transmitted by UDK 2 to MPU 1 is also protected by an embedded authentication field 88 as shown in FIG. 13 (*b*) illustrating a "service request" data block. In FIG. 13 (*b*), manufacturer's identification number 33 of an addressed MPU 1 is the destination address of data block 87, 89 denotes a block sequence number assigned by UDK 2 and 91 denotes a data field (e.g., bingo card contents). Only a specific MPU 1 addressed in the field 33 recognizes and authenticates data block 87 since only this specific device was downloaded by PC 21 with a specific digital key 82 matching data block 87. A sufficiently long digital signature 88 virtually guarantees that the outcome of the game shown on touchscreen 3 is correct rather than "hacked" by some prankster.

The above-described technique of secure two-way communication between MPU 1 and UDK 2 over public RF channel 31 with the help of an encryption key 82 downloaded by UDK 2 into MPU 1 over a secure wired channel is useful not only for playing bingo games but is also beneficial for playing "classic" casino games, such as poker, slots and keno. For example, a player can play a slot game on MPU 1 by simply touching touchbutton "SPIN" 92 displayed on touchscreen 3. Once a player touches button 92, MPU 1 causes the image of reels 93 on display 3 to spin and transmits an encoded request 83 having data field 86 structured as "spin request" data block 94 illustrated in FIG. 12 (*b*). The field 95 of block 94 specifies a number of coins the player wagered and the field "SPIN" 96 specifies a request to generate a random final position for the reels 93 to stop. Since MPU 1 is not a per se secure device, the outcome of the game cannot be determined by MPU 1 itself. Only secure PC 21 of UDK 2 can be trusted to generate random numbers on behalf of MPU 1 and thusly determine the prize, if any, won by MPU 1. Upon receiving request 94, UDK 2 randomly generates a new final position for the "reels" 93 and transmits it in an encoded, authenticated form to MPU 1. The MPU 1 decodes the response received from UDK 2 and gradually slows down the "reels" to a new final position determined by UDK 2.

Figure 14:
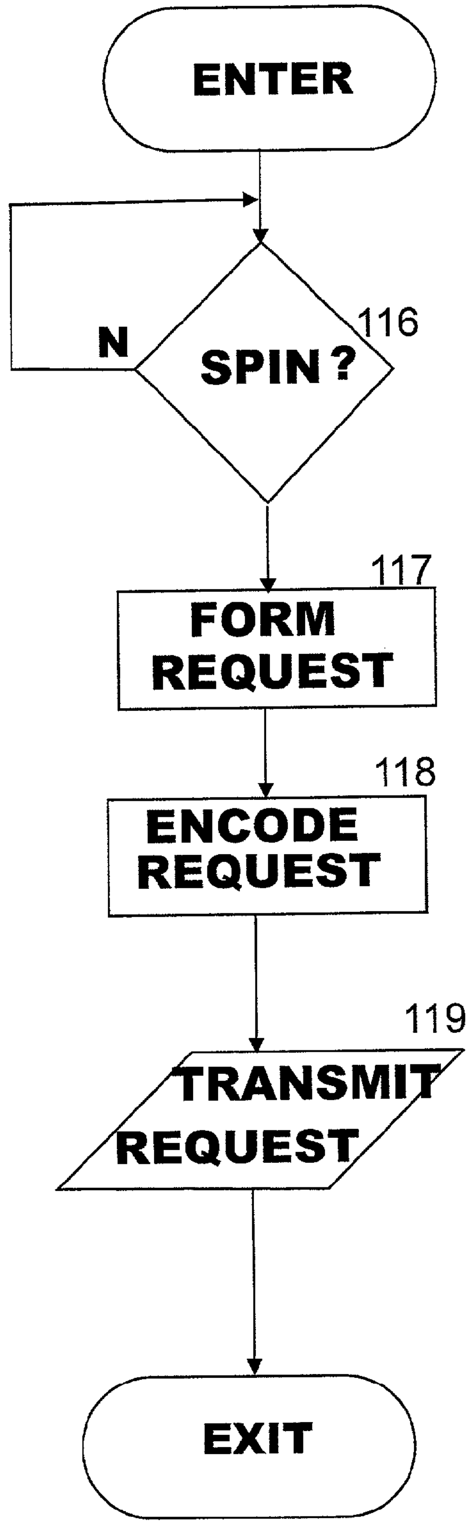
FIG. 14 illustrates a "initiate spin" task of the embodiments of the present invention.
Figure 15:
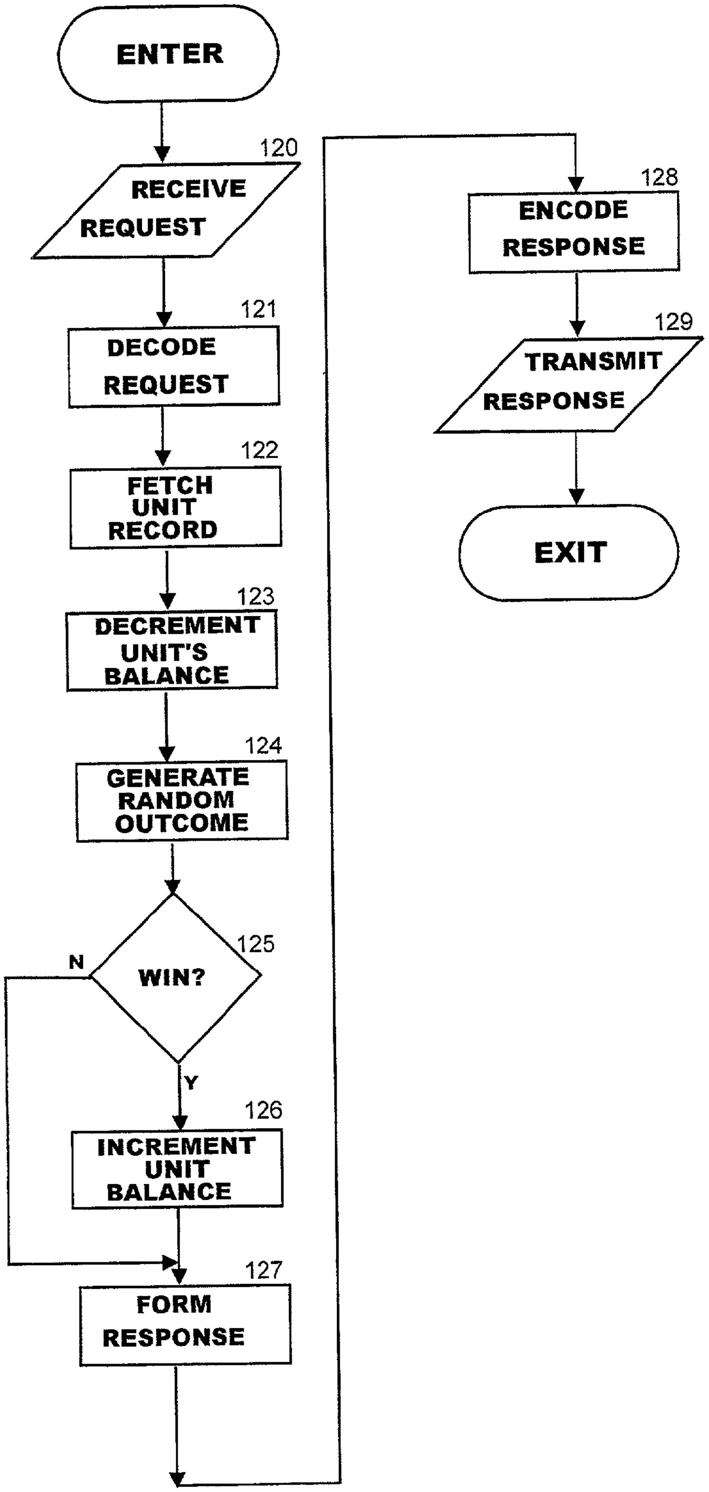
FIG. 15 illustrates a "determine outcome" task of the embodiments of the present invention.
Figure 16:
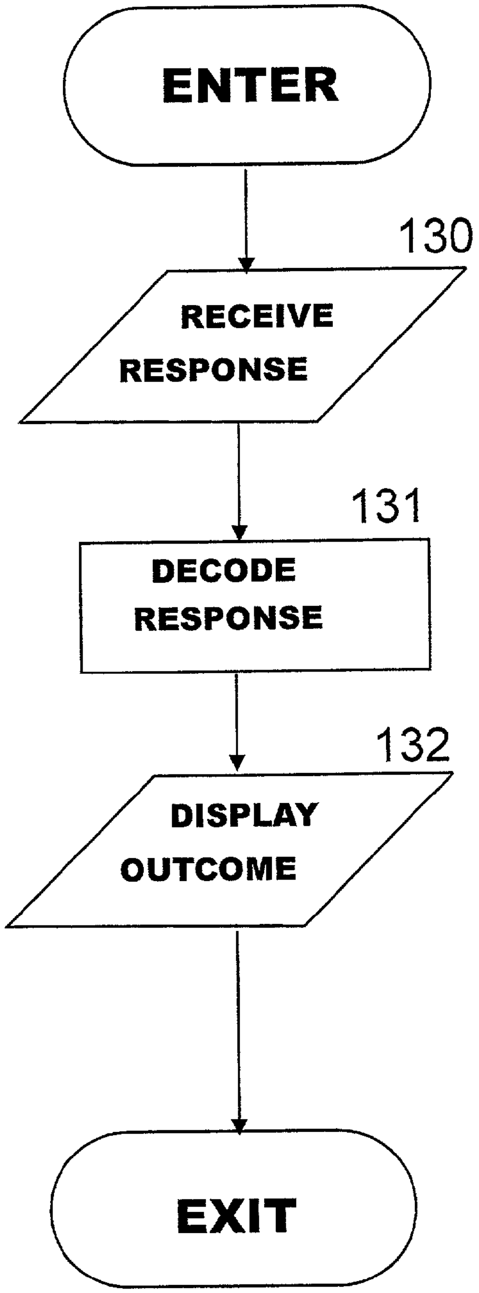
FIG. 16 illustrates a "display outcome" task of the embodiments of the present invention.

The above general outline of events involved in playing slots on MPU 1 is illustrated by flowcharts presented in FIGS. 14 through 16. Specifically, FIG. 14 illustrates the "initiate spin" task performed by MPU 1 in response to pressing push-button "SPIN" 92. Note that similarly to PC 21, MPU 1 also executes a multitasking application program preferably, in Linux® environment. The processing involves a repetitive polling of touchscreen button 92 by the embedded microprocessor of MPU 1 in the step "SPIN?" 116. The polling continues until a pressing of button 92 is detected. Then, MPU 1 forms request 94 in the step "FORM REQUEST" 117. Subsequently, MPU 1 encodes request 94 into block 83 and transmits it via transceiver 19 in the step "TRANSMIT REQUEST" 119. The request 83 sent by MPU 1 is received by UDK 2 and processed by its PC 21 in the step "RECEIVE REQUEST" 120 shown in FIG. 15 that illustrates a "determine outcome" task. Subsequently in the step "DECODE REQUEST" 121, PC 21 decodes the true request 94 from its received encapsulated form 83 using the encryption/decryption key 82 stored in table 35. In the same step "DECODE REQUEST" 121, PC 21 strips out the manufacturer's identification number 33 of MPU 1 that transmitted request 83. Using the decoded manufacturer's identification number 33, PC 21 then performs the step "FETCH UNIT RECORD" 122 by searching group 70 of table 35 for a record matching MPU1 that transmitted the received request 83. Subsequently, in the step "DECREMENT UNIT'S BALANCE" 123, PC 21, assuming the current balance 57 is sufficient, decrements a player's balance 57 by the amount of coins specified in the field 95 of request 94.?? Rob to edit At this point, PC 21 determines the random outcome of player's bet 95 by executing the step "GENERATE RANDOM OUTCOME" 124 involving a generation of a pseudo random number with the help of a conventional software utility. If the generated random outcome results in winnings as determined in the test step 125, PC 21 increments a player's balance 57, by the amount won as specified in the paytable of the game stored in the memory of PC 21, in the step "INCREMENT PLAYER'S BALANCE" 126. Otherwise, PC 21 directly proceeds to the step "FORM RESPONSE" 127. In the latter step, PC 21 forms data field 91 and the return address 33 of MPU 1 and increments the block sequence number 89. Subsequently, PC 21 computes digital signature 88 utilizing the encoding/decoding key 82 in the step "ENCODE RESPONSE" 129. Finally, PC 21 transmits the fully formed response 87 to MPU 1 via transceiver 16. The response 87 of UDK 2 is received by MPU 1 in the step "RECEIVE RESPONSE" 130 and is decoded in the step "DECODE RESPONSE" 132 with the help of key 82. Specifically, the random outcome of the game 91 is filtered out and is presented on touchscreen 3 in the step "DISPLAY OUTCOME" 132 shown in FIG. 16 illustrating a "display outcome" task.

Figure 17:
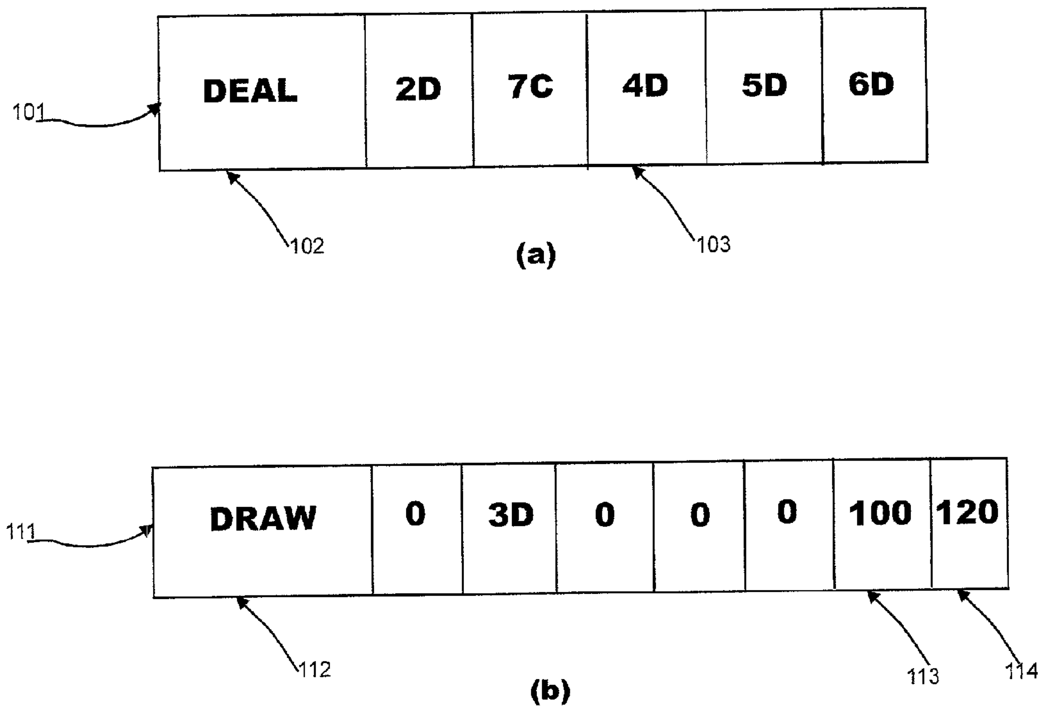
FIG. 17 (*a*) illustrates a "deal" data block of the embodiments of the present invention.

MPU 1 allows playing of a poker game in a similar manner. Specifically, a player touches a toggle touchbutton "DEAL/DRAW" 97 on touchscreen 3 requesting a new "deal." In response, MPU 1 forms a player's request block 83 with the data field 86 structured in the form 98 of a "deal request" data block illustrated in FIG. 12 (*c*) wherein 99 is a number of coins the player bets while the request field 100 specifies a request to generate a random hand of cards. The request 98 is authenticated by MPU 1 and relayed to UDK 2 in the form 83. Once UDK 2 receives "DEAL" request 98, PC 21 sends a set of randomly generated cards back to MPU 1 in an encoded and authenticated format 87 with data field 91 structured as shown in FIG. 17 (*a*) illustrating a "deal" data block. Specifically, FIG. 17 (*a*) illustrates a case wherein PC 21 generates a random deal hand consisting of the two of diamonds, seven of clubs, four of diamonds, five of diamonds and six of diamonds. The generated hand is encoded as a data block 101 shown in FIG. 17 (*a*) wherein 102 is a response identification field "DEAL" and 103 is a five-byte long data field containing encoded representation of dealt cards. The received random poker hand is displayed to the player by MPU 1 on its touchscreen 3. The player then makes his selection as to which cards to hold by touching respective cards on the screen 3 and presses the toggle touchbutton "DEAL/DRAW" 97. Once the player does so, MPU 1 sends a request 83 to UDK 2 with the data field 86 structured as "draw request" data block 104 illustrated in FIG. 12 (*d*) wherein the five consecutive fields 105 through 106 indicate respectively which cards the player decided to hold as indicated by their value being equal to one, and which cards are to be discarded as indicated by their value being equal to zero. The main field "DRAW" 110 indicates that this is a request to draw random cards to substitute for the cards the player decided to discard. In this specific case, the player makes an obvious choice to discard the "seven of clubs" and retain the rest of the dealt cards. In response, UDK 2 sends back an encrypted block 87 containing a data filed structured as block 111 shown in FIG. 17 (*b*) illustrating a "draw" data block. The response identification field "DRAW" 112 in FIG. 17 (*b*) indicates that this is an outcome of a poker game. Specifically, the five consecutive bytes of information following the "DRAW" field contain the drawn cards, the next two byte data field 113 contains the amount won by the player, and the last two byte data field 114 contains the player's new account balance. As illustrated in FIG. 17 (*b*), the drawn card is the "three of diamonds", the prize won as a result of the "straight" is one hundred coins, and the player's new balance is one hundred twenty coins. Note that MPU 1 does not have any responsibility for generating random numbers nor maintaining the current player's balance but rather simply displays the balance computed by UDK 2 on behalf of MPU 1.

In a manner similar to that described above, MPU 1 may be adapted to play virtually any casino game, including black jack, keno, roulette, sports book and horse racing. In fact, MPU 1 can play several games concurrently. For example, slots and bingo can be played concurrently as taught in U.S. Pat. No. 4,856,787 to Itkis et al. Moreover, the preferred embodiment illustrated in FIG. 1 can be adapted to implement a broad variety of various applications without departing from the main principles of the invention. For example, although FIG. 1 shows only one UDK 2, a casino may have any number of such UDKs 2 installed throughout the property and integrated in an extended local area network. The networked UDKs 2 can interchange data over a local area network 22 extended beyond a single UDK 2 and can share a common player database 35. In a casino equipped with a number of such networked UDKs 2, a player may rent MPU 1 from a first such UDK 2 and return it to a second such UDK 2.

Moreover, the extended LAN 22 can be equipped with multiple connectors 23 installed throughout the casino, such as near lounge chairs, for convenient player access as illustrated in FIG. 2 by MPU 1 that is positioned outside UDK 2 and is plugged into LAN 22 via a cable 115 leading to connector 23. Once securely downloaded inside UDK 2 with authentication key 82, MPU 1 can be carried by a player to any such external outlet of extended LAN 22. Once plugged into socket 23, MPU can directly communicate with UDK 2 over LAN 22 instead of RF channel 31. Therefore, MPU 1 can send to and receive from UDK 2 data blocks 83 and 87 over LAN 22. Advantages of such a "plug and play" arrangement include the virtual absence of noise, a much higher channel throughput as compared with RF channel 31, and an additional level of security afforded by wired cables. These advantages may well outweigh the additional cost of running LAN 22 throughout casino. Of course, a "plug and play" MPU 1 still must be initially downloaded with secure encryption key 82 inside UDK 2, otherwise MPU 1 can be easily subverted in transit between UDK 2 and socket 23 installed on the casino floor.

Figure 18:
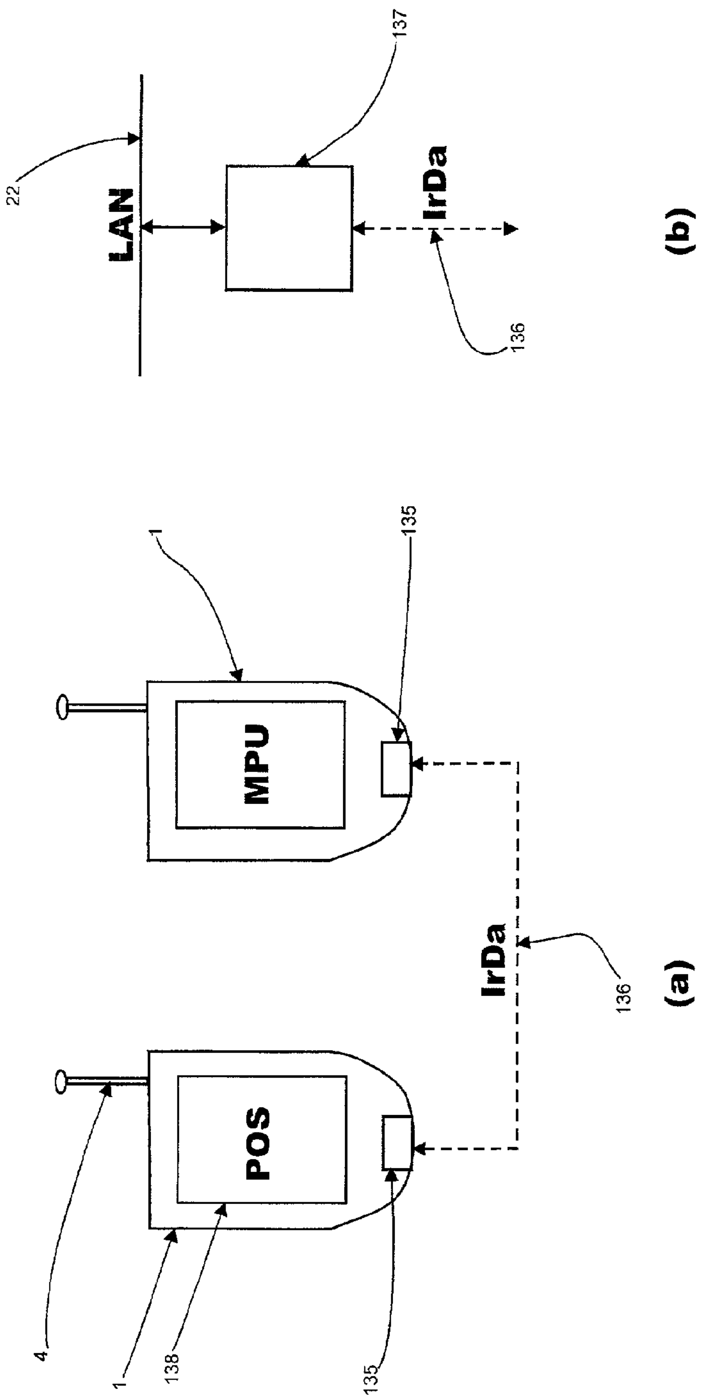
FIG. 18 (*a*) illustrates a lateral communication between two player units via an infrared port of the embodiments of the present invention.

Although connectors 7 and 23 are described as the primary LAN 22 channel for downloading to MPU 1 by UDK 2, their communication function can also be carried out by infrared communication ports built into MPU 1 and UDK 2 as is illustrated in FIG. 18. As shown in FIGS. 18 (*a*) and 18 (*b*) respectively, MPU1 is equipped with infrared (IrDa) communications port 135, while LAN 22 is equipped with a matching IrDa port 137. Note that although infrared ports 135 and 137 are more expensive than connectors 7 and 23, the former do not require a precise alignment of the communicating devices and, therefore, are frequently utilized in PDAs for the purposes of communicating with downloading stations. Ports 135 and 137 allow UDK 2 to download MPU 1 through infrared channel 136. Moreover, a commercial wireless PDA equipped with an infrared port 135 can function as MPU 1, provided it is downloaded by PC 21 not only with encryption key 82 and/or bingo pack 43 but also with the above-described executable program for playing casino games and such downloading is performed via an infrared communication port. Note that techniques of downloading executable files from a stationary device into a portable device are well known and not explained herein. Therefore, an opportunity for a player to bring to the casino a favorite PDA and use it as a personal slot machine may be very attractive for some casinos because it decreases the cost of owning and maintaining the rental fleet of MPU 1 devices.

Similarly, an off-the-shelf programmable telephone equipped with a graphics display and menu-navigation keys 6 may serve as a MPU 1. A broad variety of downloadable "third generation" telephones is available on the market. In case of a telephone-based implementation, a player may use his or her own telephone for playing casino games in the above-described manner, provided of course, that the player's telephone is downloaded with a security key 82 as a precondition for playing casino games. Assuming connector 7 is compatible with the downloading and recharging connector of such a telephone, a player may insert a telephone into any available or reserved slot 17 of UDK 2 and wait a few seconds while PC 21 downloads key 82 into the memory of the player's telephone. In addition to key 82, PC 21 also downloads the above-described casino games into the player's telephone. The downloadable casino games are preferably written in JAVA language since many modern commercial telephones are capable of downloading and executing application programs written in JAVA language.

Infrared port 135 built into MPU 1 also allows for lateral communication between two MPUs 1 as illustrated in FIG. 18 (*a*). Two MPUs 1 can interchange arbitrary data via their respective ports 135. Such a data interchange is secure provided two units 1 are placed in close proximity to one another and their IrDa ports 135 are aimed at each other. Note that a likelihood of intercepting a line-of-site infrared communication between two closely located MPUs 1 by an outsider is negligible. This opens up an opportunity for utilization of a MPU 1 as a mobile point-of-sale terminal as indicated by numeral 138 in FIG. 18 (*a*). Specifically, one of the MPU 1 units may be allocated to a casino employee. Initially, MPU 1 allocated to a casino employee may be downloaded with a large number of bingo packs 43 as described above. Subsequently, the casino employee may dispense, via aligned infrared ports 135, a portion of the bingo packs 43 stored in its memory to a MPU 1, PDA or telephone in possession of a player. The information about such an indirect downloading of player's MPU 1 by a casino employee may be reported by the employee's MPU 1 to UDK 2 via antenna 4. Since RF communication between the employee's MPU 1 and UDK 2 is inherently secure, the entire process of indirect downloading of the player's MPU 1 is also secure. The data downloaded into player's MPU 1 from the employee's MPU 1 is not limited to bingo cards. A unique data encryption key 82 reserved for the player can be downloaded from the employee's MPU 1 along with monetary credits and casino games as well.

A viable alternative to downloading files via communication ports 7 and 23 and/or ports 135 and 137 is utilization of smart cards for transporting files from PC 21 to MPU 1. Assuming card reader 11 is equipped with a smart-card reader/writer circuitry, the necessary files can be written onto a smart-card and subsequently read-in by MPU 1 that is also equipped with a smart card reader/writer peripheral. Since many modern PDA devices are equipped with smart-card readers/writers, the opportunity for a player to play casino games on his or her own PDA in a casino becomes even more feasible, assuming of course, the above-described security techniques are followed.

Another alternative for inputting encryption key 82 into MPU 1 includes a player reading key 82 from receipt 44 and manually entering key 82 into MPU 1 via a touch-pad on touchscreen 3. Although manual entry of key 82 is subject to error, it may be used as a substitute for the downloading of key 82 in an effort to save costs or in the case of a failure of downloading the key 82 via connectors 7 and 23.

Figure 19:
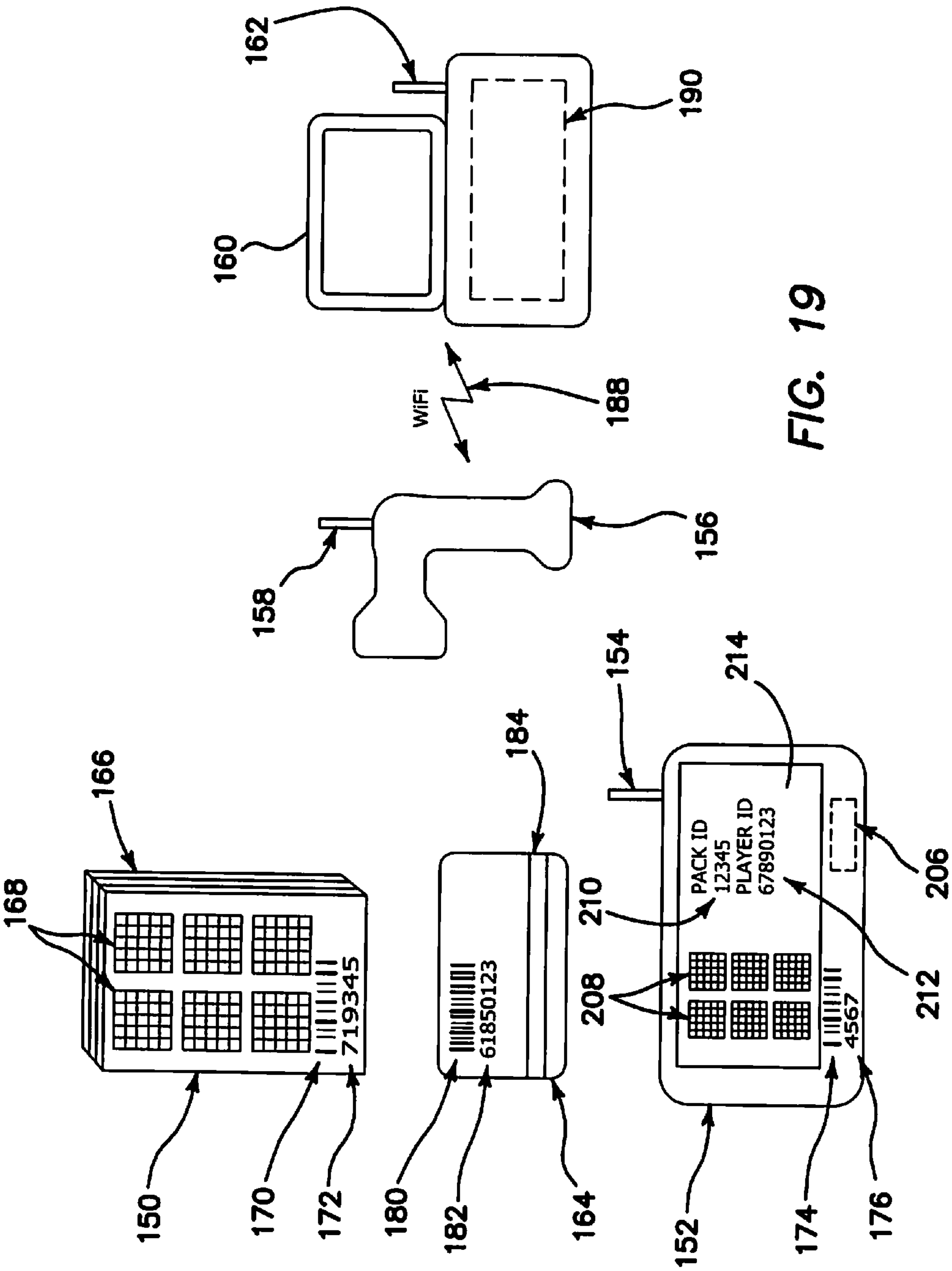
FIG. 19 illustrates a player tracking and bingo card downloading system according to the embodiments of the present invention.

A system to assure efficient and effective player tracking and downloading of game ticket data to a game unit by a roving cashier is illustrated in FIG. 19. The system includes a game ticket 150, game unit 152 (such as a wireless game unit disclosed above), equipped with WiFi transceiver 154, a wireless barcode reader 156 equipped with a radio transceiver 158 (such as WiFi), a game server 160 including a wireless transceiver 162 (such as WiFi), and a player loyalty (tracking) card 164. As illustrated, the game ticket 150 is exemplified by a "6-on" bingo pack 166 imprinted with six bingo cards 168 and a ticket barcode 170 (expressed numerically as the ticket identification 172) that uniquely identifies the pack 166. The game unit (or player unit) 152 is also uniquely identified by a barcode, specifically by a device barcode label 174 affixed thereto (expressed numerically as the device identification 176). Similarly, the player loyalty card 164 also carries a barcode label 180 (numerically expressed as the card identification 182) and may optionally carry a magnetic stripe 184 encoding the same card identification 182.

Figure 20:
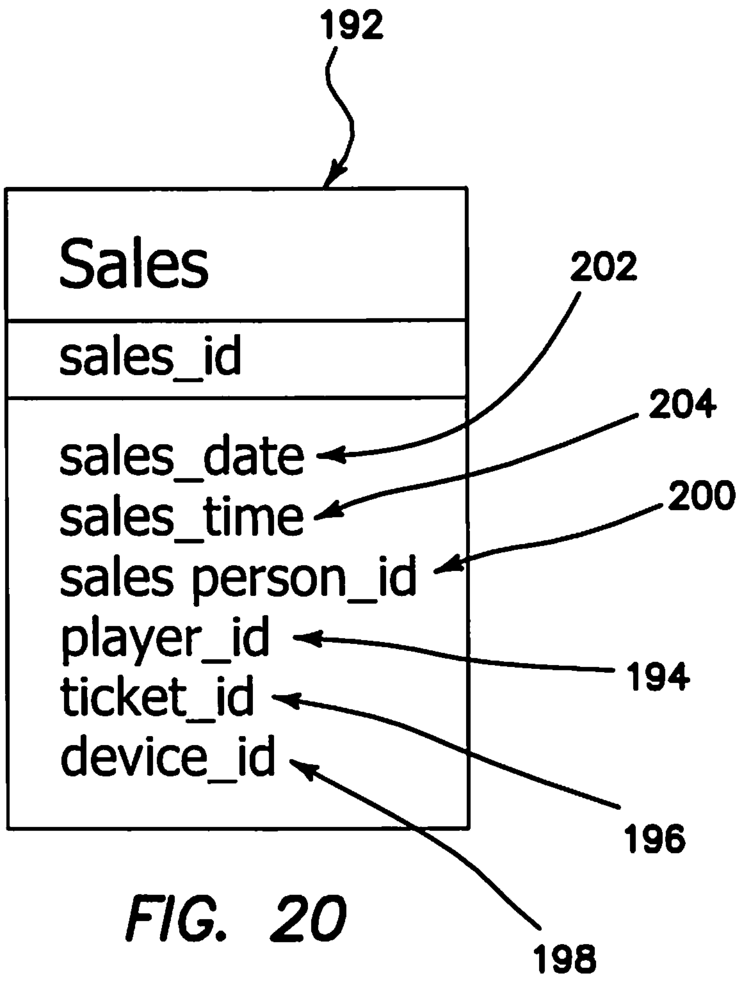
FIG. 20 illustrates a database table according to the embodiments of the present invention.

The barcode reader 156 is utilized by a roving cashier (floor agent) to read at least two of the barcodes 170, 174 and 180. The barcodes 170 and/or 174 and/or 180 read by barcode reader 156 are transmitted by reader 156 (via WiFi transceiver 158) to the central file server 160 (via its WiFi transceiver 162), which stores the received (over WiFi channel 188) the barcodes 170 and/or 174 and/or 180 in internal database 190 (outlined by dashed lines) exhibiting a sales table 192 as illustrated in FIG. 20 residing in the database 190. The sales tables 192 includes player id 194, ticket id 196 and device id 198 containing the player identification 176, the ticket identification 172 and the device identification 182, respectively. In addition, the sales table 192 includes conventional date row 202 and time row 204 and importantly a salesperson identification row salesperson id 200.

Once the player identification 176 and the game ticket identification 172 are stored in the database 190, a sales transaction record is made in the database 190 linking a player identified by the player identification 176 with the bingo pack 166 identified by the barcode identification 176. Such a sales transaction relationship can subsequently be processed using conventional data processing techniques to generate conventional player tracking reports.

Similarly, once the game ticket identification 172 and the game device identification 182 are stored in the database 190 of the central file server 160, the latter can wirelessly download bingo pack identification 172 directly into the game unit 152 identified by the game device identification 182 (the central file server 160 stores in database 190 an address translation table that links together bar-coded device identification 182 with the Internet Protocol (IP) addresses of the game unit 152). Once the game unit 152 wirelessly receives the pack identification number 172 via WiFi transceivers 154 and 162 over the channel 188, the game unit 152 can then fetch or retrieve bingo card 168 contents either from internal database 206 (outlined by dashed lines in FIG. 19), or remotely, from the central database 190 utilizing conventional bingo cards downloading techniques. Subsequently, the game unit 152 can display images 208 of bingo cards 168, pack id 210 and player id 212 on touch screen 214.

The system shown in FIG. 19 may be implemented in various embodiments without departing from the spirit and scope of the present invention. In particular, the game unit 152 may be implemented as a stationary PC-type computer interconnected with the file server 160 over a conventional Ethernet network. Also, at least the player card identification 182 may be machine-read by a conventional magnetic card reader rather than by a barcode reader 156.

Although the invention has been described in detail with reference to a preferred embodiment, additional variations and modifications exist within the scope and spirit of the invention as described and defined in the following claims.

We claim:

1. A gaming system, comprising:

a game ticket having a first barcode acting as a game ticket identifier;

a game unit having a second barcode acting as a game unit identifier;

a game server;

a barcode reader configured to read the first barcode and the second barcode and transmit corresponding data to said game server, said barcode reader being separate from the game unit and not communicating the first barcode to the game unit; and wherein the game server stores both the first barcode and the second barcode and transmits game data corresponding to the game ticket identifier to the game unit.

2. The gaming system of claim 1 further comprising a player card having a third barcode, said barcode reader further configured to read by the third barcode and transmit corresponding data to the game server.

3. The gaming system of claim 1 wherein said game ticket relates to bingo.

4. The gaming system of claim 1 wherein the game unit is configured to display information corresponding to the game data.

5. A method of downloading to a game device gaming data relevant to a gaming ticket comprising the following steps:

machine reading a game ticket identification with a barcode reader separate from said gaming device;

machine reading a game device identification on a game device with said barcode reader;

transmitting both the game ticket identification and the game device identification to a game server;

retrieving from the game server, game data associated with the game ticket identification; and transmitting the game data, excluding the game ticket identification, to the game device associated with the game ticket identification.

6. The method of claim 5 further comprising downloading game data corresponding to a game of bingo.

7. The method of claim 5 further comprising utilizing a barcode reader for machine reading said game ticket identification and game device identification.

8. The method of claim 5 further comprising machine reading a player card identification.

9. The method of claim 5 further comprising displaying on the game device game data relevant to the game ticket.

10. A gaming system, comprising:

a bingo game ticket having a first barcode acting as a game ticket identifier;

a game unit having a second barcode acting as a game unit identifier;

a game server;

a barcode reader configured to read the first barcode and the second barcode and transmit corresponding data to said game server, said barcode reader being separate from the game unit and not communicating the first barcode to the game unit;

wherein the game server stores both the first barcode and the second barcode and transmits game data corresponding to the bingo game ticket identifier to the game unit, said game data including bingo card patterns for display on the game unit; and wherein the game server generates a sales table including at least the following: (i) device identification; (ii) ticket identification; (iii) player identification; and (iv) sales person identification.

11. The gaming system of claim 10 further comprising a player card having a third barcode, said barcode reader further configured to read by the third barcode and transmit corresponding data to the game server.

12. A method of downloading to a game device gaming data relevant to a gaming ticket comprising the following steps:

machine reading a bingo game ticket identification with a barcode reader;

machine reading a game device identification from a game device with said barcode reader;

transmitting both the bingo game ticket identification and the game device identification to a game server, said barcode reader being separate from the game device and not communicating the bingo game ticket identification to the game device;

retrieving from the game server, game data associated with the bingo game ticket identification;

transmitting the game data from the game server to the game device associated with the game ticket identification, said game data including bingo card patterns for display on the game device; and generating a sales table including at least the following: (i) device identification; (ii) ticket identification; (iii) player identification; and (iv) sales person identification.

13. The method of claim 12 further comprising a player card having a third barcode, said barcode reader further configured to read by the third barcode and transmit corresponding data to the game server.

* * * * *